United States Patent
Wu et al.

(10) Patent No.: US 9,073,037 B2
(45) Date of Patent: Jul. 7, 2015

(54) SEMICONDUCTOR PHOTOCATALYST FOR THE PHOTOCATALYTIC REFORMING OF BIOMASS DERIVATIVES FOR HYDROGEN GENERATION, AND PREPARATION AND USE THEREOF

(75) Inventors: Lizhu Wu, Beijing (CN); Zhijun Li, Beijing (CN); Chengbo Li, Beijing (CN); Xubing Li, Beijing (CN); Jiaxin Li, Beijing (CN)

(73) Assignee: Technical Institute of Physics and Chemistry of the Chinese Academy of Sciences, Beijing (CN)

( * ) Notice: Subject to any disclaimer, the term of this patent is extended or adjusted under 35 U.S.C. 154(b) by 0 days.

(21) Appl. No.: 13/883,180

(22) PCT Filed: Nov. 4, 2011

(86) PCT No.: PCT/CN2011/001863
§ 371 (c)(1),
(2), (4) Date: May 2, 2013

(87) PCT Pub. No.: WO2012/058869
PCT Pub. Date: May 10, 2012

(65) Prior Publication Data
US 2013/0224105 A1  Aug. 29, 2013

(30) Foreign Application Priority Data

Nov. 4, 2010 (CN) .......................... 2010 1 0536574
Oct. 12, 2011 (CN) .......................... 2011 1 0308867
Nov. 3, 2011 (CN) .......................... 2011 1 0344439

(51) Int. Cl.
*B01J 23/06* (2006.01)
*B01J 23/14* (2006.01)
(Continued)

(52) U.S. Cl.
CPC .............. *B01J 27/1853* (2013.01); *B01J 23/40* (2013.01); *B01J 23/50* (2013.01); *B01J 23/70* (2013.01);
(Continued)

(58) Field of Classification Search
USPC .................. 502/325, 328, 330, 340, 344, 350
IPC .................. B01J 35/004,21/063, 23/06, 23/14, B01J 23/60, 23/62, 23/626, 23/6442, 23/681, B01J 23/76, 23/80, 37/04, 37/086, 37/088; H01L 31/035218
See application file for complete search history.

(56) References Cited

U.S. PATENT DOCUMENTS 6,653,356 B2 * 11/2003 Sherman .......................... 516/90
2004/0046168 A1 * 3/2004 Andriessen ..................... 257/43
(Continued)

FOREIGN PATENT DOCUMENTS

| CN | 101195475 | * | 6/2008 | ................ C01B 3/32 |
| CN | 101745406 | | 6/2010 | |
| JP | 57-156302 | | 9/1982 | |

OTHER PUBLICATIONS

International Search Report of PCT/CN2011/001863 dated Feb. 16, 2012.

*Primary Examiner* — Patricia L Hailey
(74) *Attorney, Agent, or Firm* — Rankin, Hill & Clark LLP

(57) ABSTRACT

Disclosed are a semiconductor photocatalyst for the photocatalytic reforming of biomass derivatives for hydrogen generation, and preparation and use thereof. The semiconductor photocatalyst has the atomic composition ratio of M~N-Ax; wherein M~N are IIB group elements to VIA group elements, or IIIA group elements to VA group elements, A being one element or more than two elements selected from the group consisting of cobalt, nickel, iron, copper, chromium, palladium, platinum, ruthenium, rhodium, iridium and silver; and $0.02\% \le x \le 1.0\%$. The method of in-situ preparation of the highly effective semiconductor photocatalyst and catalytically reforming biomass derivatives for hydrogen generation by driving photoreaction with visible light via quantum dots is simple, fast, highly effective, inexpensive and practical. The in situ reaction can occur in sunlight without the need of harsh conditions such as calcination.

13 Claims, 10 Drawing Sheets

(51) Int. Cl.

| | | |
|---|---|---|
| *B01J 23/60* | (2006.01) | |
| *B01J 23/62* | (2006.01) | |
| *B01J 23/76* | (2006.01) | |
| *B01J 23/80* | (2006.01) | |
| *B01J 37/04* | (2006.01) | |
| *B01J 27/185* | (2006.01) | |
| *B01J 23/40* | (2006.01) | |
| *B01J 23/50* | (2006.01) | |
| *B01J 23/70* | (2006.01) | |
| *B01J 35/00* | (2006.01) | |
| *C01B 3/32* | (2006.01) | |
| *B01J 23/843* | (2006.01) | |
| *B01J 27/043* | (2006.01) | |
| *B01J 27/057* | (2006.01) | |
| *B01J 37/03* | (2006.01) | |
| *B01J 37/34* | (2006.01) | |

(52) U.S. Cl.
CPC ............... *B01J 35/004* (2013.01); *C01B 3/326* (2013.01); *C01B 2203/0233* (2013.01); *C01B 2203/1211* (2013.01); *C01B 2203/1217* (2013.01); *C01B 2203/1223* (2013.01); *C01B 2203/1229* (2013.01); *B01J 23/8432* (2013.01); *B01J 27/043* (2013.01); *B01J 27/0573* (2013.01); *B01J 27/0576* (2013.01); *B01J 37/031* (2013.01); *B01J 37/345* (2013.01); *B01J 35/0013* (2013.01)

(56) References Cited

U.S. PATENT DOCUMENTS

2005/0191505 A1* 9/2005 Akarsu et al. .................. 428/469
2005/0265935 A1* 12/2005 Hollingsworth et al. ....... 424/59
2007/0137998 A1* 6/2007 Sykora et al. ............ 204/157.15

* cited by examiner

SEMICONDUCTOR PHOTOCATALYST FOR THE PHOTOCATALYTIC REFORMING OF BIOMASS DERIVATIVES FOR HYDROGEN GENERATION, AND PREPARATION AND USE THEREOF

FIELD OF THE INVENTION

The present invention relates to a photocatalyst and preparation method and use thereof, especially, to a semiconductor photocatalyst for photocatalytically reforming biomass derivatives to generate hydrogen, and preparation method and use thereof.

BACKGROUND OF THE INVENTION

Energy resource is the basis for the development of the current society, and is also an index for restricting the development of national economy and evaluating the national comprehensive strength. It is therefore important for the national safety and is always the first strategic field developed by the countries in the world. Up to date, the traditional fossil fuels, such as coal, oil and natural gas, suffer from low utilization rate, serious environmental pollution and shortage, and thus will not satisfy the requirement in future for an energy system that needs highly efficient, clean, economy and safe. The development of sustainable energy source is a huge challenge and under great pressure in both scientific and industry community. Meanwhile, people's concerns on the global environmental problems such as climate change and environmental pollution make the future energy production and utilization focus on the environmental and ecologic effect. The development of renewable energy solutions must be one of the important issues in the century.

Hydrogen energy is considered as an important secondary energy in the $21^{st}$ century. It is a superior new energy source with main advantages as follows. Hydrogen has a high combustion heat value, and the combustion heat of every kilogram of hydrogen is about 3 times to that of petroleum, 3.9 times to that of alcohol and 4.5 times to that of char. The burning product of hydrogen is water, and thus it is indeed a clean energy. Hydrogen has abundant resources, and it could be obtained from water or biomass, both of them are the most abundant resource on earth, which is well evidenced by a classic procedure of nature in a recycling and sustainable way. The application of hydrogen energy is quickly growing with the progress of various techniques, and thus it is of great interest to develop hydrogen energy.

Nowadays, the production of hydrogen from fossil fuels is the main approach to obtain hydrogen in industry. As an alternative, the production of hydrogen by electrolysis is the other one. Although the current techniques for producing hydrogen from fossil fuels is mature with low production cost, the resources is limited and is non-renewable. In the long run, it does not meet the requirements for sustainable development. It is of great interest to produce hydrogen by solar energy, which converts the inexhaustible and dispersed solar energy into highly concentrated clean hydrogen energy. Currently, the methods for producing hydrogen by water-splitting with solar energy include a method for producing hydrogen by pyrolysing water with solar energy, a method for producing hydrogen by electrolysing water with solar powered electricity, a method for producing hydrogen by splitting water with solar energy, a method for producing hydrogen by photocatalytically reforming biomass with solar energy, and so on. It is of great significance in reality to produce hydrogen with solar energy, which, however, is a challengable research project with a large amount of theoretical and technical problems to be solved. It has drawn a great attention in the world, and many labor, funds and material resources have been invested. Particularly, the production of hydrogen with biomass, as an effective approach for solving energy problem, has recently appeared at a forefront.

Biomass is the most abundant material on earth, and includes all animals, plants and microorganisms as well as many organics derived, excreted and metabolised from the living materials. All the biomass has energy. Biomass energy is the energy produced from biomass using biomass as the carrier. The biomass energy is an energy form of solar energy that is stored in organism in the form of chemical energy, and comes from photosynthesis of plants, either directly or indirectly. Although the overall energy consumed by photosynthesis of plants only accounts for 0.2% of the total solar energy reaching on earth, the absolute value is surprisingly huge and the energy generated by photosynthesis is about 40 times to the total energy that human have consumed. Thus, biomass refers to a huge energy source. Yet, the biomass energy has clear disadvantages of low energy density and random distribution, although biomass is distributed all over the world with great reserves. As mentioned above, hydrogen is an excellent clean energy with high energy density and high efficiency. Hydrogen could be transported, or stored in long term, and liquified hydrogen has a density higher than natural gas. Thus, it would be easier to convert the large amount of dispersed biomass into hydrogen to transport and store, which is an important approach to store and concentrate biomass energy. More importantly, the technique of photocatalytically reforming biomass to generate hydrogen can be carried out under ambient temperature and pressure powered by solar energy. The fact for this energy conversion converts the inexhaustible solar energy into human desired energy is not only sustainable, but also environmental-friendly.

Thus, it is of great significance to develop a method for hydrogen production by solar energy with high efficiency and low cost, with respect to the improvement of energy infrastructure, the protection of ecological environment and the promotion of the sustainable development of economy and society.

Early in 1980s, Japanese scientists Kawai et al (Chem. Lett. 1981, 81-84; Nature. 1980, 286, 474-476) reported hydrogen generation by photocatalytically reforming biomass derivatives in water, using $Pt/RuO_2/TiO_2$ as the catalyst. Later, many literatures (J. Phys. Chem. 1983, 87, 801-805; J. Am. Chem. Soc. 1985, 107, 1773-1774; Chem. Phys. Lett. 1981, 80, 341-344; Photochem. Reviews 2003, 4, 5-18; Catal. Lett. 2004, 98, 61; Chem. Commun 2004, 2192-2193) reported methods for hydrogen generation from various biomass derivatives, such as methanol, ethanol, lactic acid, glycine, glutamic acid, proline, sugar, soluble starch, gelatin protein, algae, cockroach body, human urine, animal manure, teared filter paper (the major component thereof is cellulose), and so on.

Meanwhile, there are also patents involving photocatalytically reforming biomass derivatives by solar energy to generate hydrogen. Japanese patent application 57,156,302 disclosed a method for photocatalytically reforming methanol using $TiO_2/CdS/GaP$ to produce hydrogen, and Japanese patent application 59,203,701 disclosed a method for photocatalyticlly reforming a mixed solution of methanol and water with a ratio of 1:1 to produce hydrogen, which uses $TiO_2$ loaded with one selected from a group consisting of CrB, $Ni_2B$, $Co_2P$, $Mo_2C$ and $Cr_3C_2$ as a catalyst. The rate of hydrogen generation is about 0.28 to 0.96 mL/h under irradiation of a 500 W UV lamp. Japanese patent application 6,186,943 disclosed a method for photocatalytically reforming a mixed solution of ethanol and water with a ratio of 1:1 to produce hydrogen, which uses amorphous Si loaded with Pt as a catalyst. The rate of hydrogen generation is up to 0.03 mL/h under irradiation of a 100 W halogen lamp. In addition, Can Li et al from DaLian Chemical and Physical institute, Chinese Academy of Sciences reported three different catalysts for photocatalytically reforming biomass derivatives to generate hydrogen. Chinese patent application CN200410031517.3 discloses a novel composite photocatalyst with a formula of $A_{1-x}TaO_3:B_x$, wherein x is 0 or 1, A is an alkaline metal and B is lanthanum or bismuth, for photocatalytically reforming biomass derivatives under UV light to generate hydrogen, and preparation method thereof. Chinese patent application CN200810240366.0 disclosed a photocatalyst based on heterojunction with a formula of m % $WO_xS_y/CdS$, wherein x represents the molar fraction of oxygen in the tungsten species with $0 \le x \le 1$, y represents the molar fraction of sulfur in the tungsten species with $0 < y \le 2$, and m is the mass percentage of tungsten element with $0 < m \le 10$. The photocatalyst is based on semiconductor heterojuction, and a heterojunction photocatalyst with high activity for reforming biomass derivatives to generate hydrogen is prepared by using a CdS catalyst as a carrier, supporting a precursor of W on the CdS catalyst by impregnation, and then assembling the sulfide (oxide) of W on the CdS. Chinese patent application 200910136643.8 disclosed a $TiO_2$ photocatalyst for photocataltically reforming biomass derivatives to generate hydrogen, wherein the crystal phase composition of anatase phase and rutile phase can vary in a relatively wide range. The $TiO_2$ photocatalyst may be used in photocataltic reformation of biomass derivatives to generate hydrogen, largely improving the activity for hydrogen generation and effectively restraining the generation of carbon monoxide. The activity of the $TiO_2$ photocatalyst for hydrogen generation is about five times to that of P25 as $TiO_2$ control, and the content of CO in hydrogen is reduced at least two orders of magnitude to less than 5 ppm.

Up to date, however, no literature or patent has reported a high efficient, stable, low cost and easily made photocatalyst for photocatalytically reforming biomass derivatives to generate hydrogen, which can be synthesized in situ by a photochemical method from quantum dots and the salts or complexes of transition metals, particularly cheap transition metals such as nickel, cobalt and iron under mild conditions.

SUMMARY OF THE INVENTION

The first technical problem to be solved by the present invention is to provide a semiconductor photocatalyst for photocatalytically reforming biomass derivatives to generate hydrogen.

The second technical problem to be solved by the present invention is to provide a method for preparing the above semiconductor photocatalyst.

The third technical problem to be solved by the present invention is to provide a system for photocatalytically reforming biomass derivatives to generate hydrogen, comprising the above semiconductor photocatalyst.

The fourth technical problem to be solved by the present invention is to provide a method for photocatalytically reforming biomass derivatives to generate hydrogen by using the above semiconductor photocatalyst.

To solve the above first technical problem, the present invention provides a semiconductor photocatalyst for photocatalytically reforming biomass derivatives to generate hydrogen, characterized in that:

the semiconductor photocatalyst has a formula of M~N-$A_x$;

wherein, M~N is group II element~group VI element, or M~N is group III element~group V element;

wherein, A is one or two or more elements selected from the group consisting of Co, Ni, Fe, Cu, Cr, Pd, Pt, Ru, Rh, Ir, Au and Ag; and $0.02\% \le x \le 1.0\%$.

In the present invention, M~N means a group II element and a corresponding group VI element; or a group III element and a corresponding group V element.

The group II element may be Zn or Cd in group IIb; the group VI element may be S or Se in group VIa; the group III element may be In in group IIIa; and the group V element may be P or As in group Va.

Preferably, the biomass derivatives may be methanol, ethanol, propanol, butanol, ethylene glycol, glycerol, glucose, sucrose, fructose, maltose, mannose, ascorbic acid, L-proline or L-cysteine.

Preferably, the semiconductor photocatalyst has a formula of $TiO_2$-M~N-$A_x$, $SnO_2$-M~N-$A_x$ or ZnO-M~N-$A_x$. The biomass derivatives may be triethanolamine, triethylamine, methanol, ethanol, propanol, butanol, ethylene glycol, glycerol, glucose, sucrose, fructose, maltose or mannose.

To solve the second technical problem, the present invention provides a method for preparing the semiconductor photocatalyst of M~N-$A_x$, comprising the steps of:

1) introducing quantum dots consisting of group II~VI elements or group III~V elements into a reactor;

2) introducing a solution of the salts or complexes of one or two or more elements selected from the group consisting of Co, Ni, Fe, Cu, Cr, Pd, Pt, Ru, Rh, Ir, Au and Ag into the reactor to afford a mixed solution A;

3) introducing an aqueous solution of a biomass derivative into the mixed solution A to give a mixed solution B;

4) adjusting the pH value of the mixed solution B to 3~10 to provide a mixed solution C, wherein the pH is adjusted by dropwise addition of 1 mol/L NaOH or 1 mol/L HCl;

5) degassing the solution. C of step 4) with an inert gas or vacuumizing the reactor; and irradiating the reactor with UV light, visible light or a mixed beam of UV and visible light to prepare in situ the semiconductor photcatalyst of formula M~N-$A_x$ under inert gas or vacuum atmosphere.

Furthermore, the present invention provides a method for preparing the semiconductor photocatalyst of $TiO_2$-M~N-$A_x$, $SnO_2$-M~N-$A_x$ or ZnO-M~N-$A_x$, comprising the steps of:

introducing quantum dots composed of group II~VI elements or group III~V elements into a reactor, then adding $TiO_2$, $SnO_2$ or ZnO, adjusting pH≥7, centrifuging and discarding the supernatant to keep the precipitates;

introducing into the precipitates one or two or more selected from group consisting of a cobalt salt, a cobalt complex, a nickel salt, a nickel complex, an iron salt, an iron complex, a copper salt and a chromium salt, or a solution of a salt of Pd, Pt, Ru, Rh, Ir, Au or Ag;

introducing an aqueous solution of a biomass derivative into the precipitates;

irradiating the reactor with UV light and/or visible light to prepare the semiconductor photocatalyst of formula $TiO_2$-M~N-$A_x$, $SnO_2$-M~N-$A_x$ or ZnO-M~N-$A_x$ under inert gas or vacuum atmosphere;

wherein, the biomass derivatives may be triethanolamine, triethylamine, methanol, ethanol, propanol, butanol, ethylene glycol, glycerol, glucose, sucrose, fructose, maltose, mannose, ascorbic acid, L-proline or L-cysteine.

Preferably, the quantum dots composed of group II~VI elements or group III~V elements in step 1) have the concentration larger than $1 \times 10^4$ g/L; and the concentration of the quantum dots refers to that of a system which has added all the materials into the reactor and fixed the volume.

The quantum dots composed of group II~VI elements includes the composite quantum dots composed of one or two or more selected from the group consisting of CdS, CdSe, CdTe, PbS, PbSe, ZnS and ZnSe The quantum dots composed of group III~V elements includes the composite quantum dots composed of one or two selected from the group consisting of InP and InAs.

Preferably, the solution of the salts or complexes of Co, Ni, Fe, Cu, Cr, Pd, Pt, Ru, Rh, Ir, Au or Ag in step 2) has a concentration larger than $1 \times 10^{-6}$ mol/L, that is, the concentration of the salts or complexes of Co, Ni, Fe, Cu, Cr, Pd, Pt, Ru, Rh, Ir, Au or Ag in the whole reaction system may be up to the saturated concentration of the salts or complexes of Co, Ni, Fe, Cu, Cr, Pd, Pt, Ru, Rh, Ir, Au or Ag. Theoretically, the salts or complexes of Co, Ni, Fe, Cu, Cr, Pd, Pt, Ru, Rh, Ir, Au or Ag may be further added without any theoretical and economy values.

The cobalt salt may be cobalt halide, cobalt sulphate, cobalt nitrate, cobalt carbonate, cobalt oxalate, cobalt acetate, cobalt phosphate or cobalt chromate.

The cobalt complex may be cobalt-ammonia complex ($[Co(NH_3)_6]^{3+}$), cobalt-cyanogen complex ($[Co(CN)_6]^{4-}$), cobalt-thiocyanate complex ($[Co(SCN)_4]^{2-}$), cobalt-carbonyl complex ($[Co(CO)_4]^-$), cobalt-nitrate complex ($[Co(NO_3)_4]^{2-}$), cobalt-nitrite complex ($[Co(NO_2)_6]^{3-}$) or cobalt-diacetyldioxime complex; wherein the cobalt-diacetyldioxime complex and derivatives thereof have the following formulae:

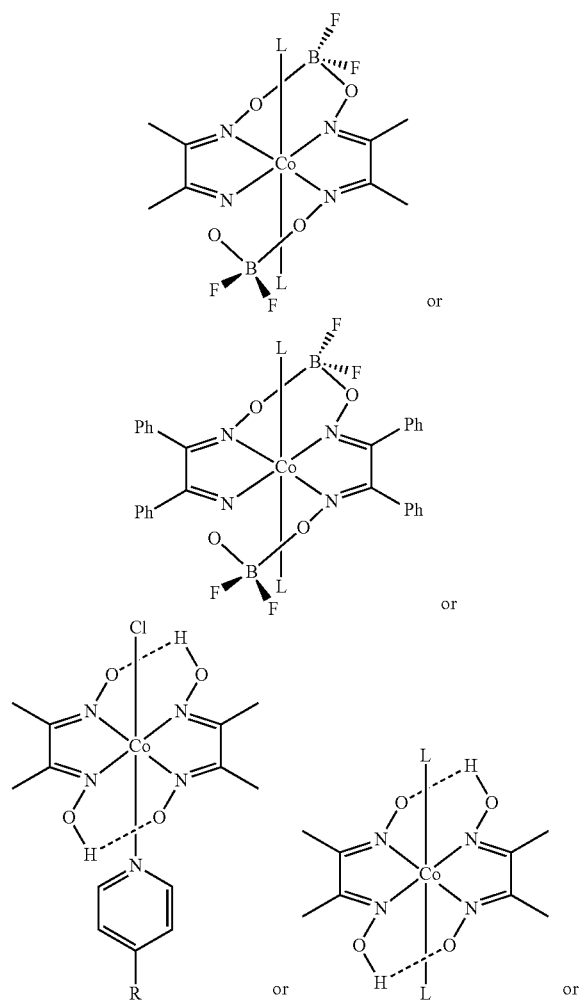

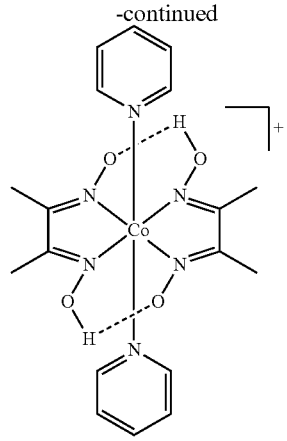

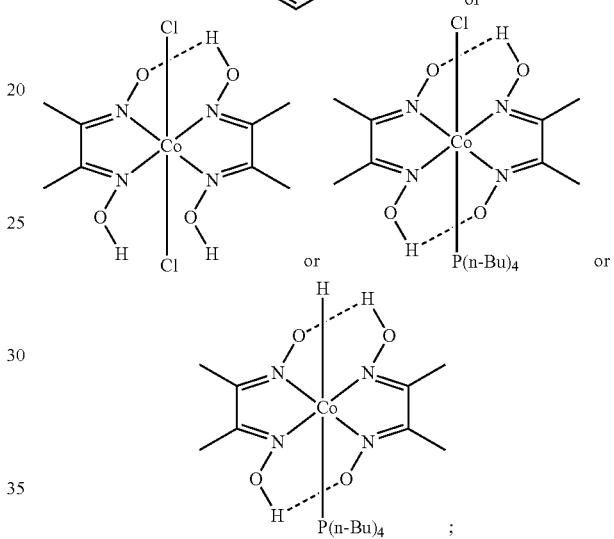

wherein, L is $H_2O$ or $CH_3CN$; R is H, $N(CH_3)_2$ or $(COOCH_3)_2$.

The nickel salt may be nickel halide, nickel sulphate, nickel nitrate, nickel carbonate, nickel oxalate, nickel acetate, nickel phosphate or nickel chromite.

The nickel complex may be nickel-ammonia complex ($[Ni(NH_3)_6]^{2+}$), nickel-cyanogen complex ($[Ni(CN)_4]^{2-}$), nickel-chelate ($[Ni(en)_3]^{2+}$), nickel-carbonyl complex ($Ni(CO)_4$), nickel-ethyl complex ($(C_2H_5)_2Ni$).

The iron salt may be iron halide, iron sulphate, iron nitrate, iron carbonate, iron oxalate, iron acetate, iron phosphate, iron chromate, ferrous halide, ferrous sulphate, ferrous nitrate, ferrous carbonate, ferrous oxalate, ferrous acetate, ferrous phosphate, ferrous chromate or ferrous ammonium sulphate.

The iron complex may be iron-cyanogen complex ($[Fe(CN)_6]^{3-}$), ferrous-cyanogen complex ($[Fe(CN)_6]^{4-}$), iron-thiocyanate complex ($[Fe(SCN)_3]$), iron-sulfur complex ($[Fe_2S_2(CO)_6]$), iron-carbonyl complex ($Fe(CO)_5$), iron-carbonyl complex ($Fe_2(CO)_9$), or iron-carbonyl complex ($Fe_3(CO)_{12}$).

The copper salt may be copper halide, copper sulphate (pentahydrate, monohydrate or anhydrous), copper nitrate, copper carbonate, copper oxalate, copper acetate, copper phosphate, copper chromate, copper pyrophosphate, copper cyanide, copper stearate, copper naphthenate, cuprous halide, cuprous sulphate, cuprous carbonate, or cuprous acetate.

The chromium salt may be chromium halide, chromium sulphate, chromium nitrate, chromium carbonate, chromium oxalate, chromium acetate, or chromium phosphate.

The palladium salt may be potassium palladochloride, palladium halide, palladium sulphate, palladium nitrate, or palladium acetate.

The platinum salt may be potassium platinochloride, platinum halide, or platinum nitrate.

The ruthenium salt may be ruthenium halide, ruthenium sulphate, ruthenium nitrate, or ruthenium acetate.

The rhodium salt may be rhodium halide, rhodium sulphate, rhodium nitrate, or rhodium acetate.

The gold salt may be gold halide or chloroauric acid.

The silver salt may be silver halide, silver sulphate, silver nitrate, or silver acetate.

Preferably, the biomass derivative in step 3) has a concentration equal to or larger than $1\times10^{-4}$ mol/L or a molar percentage of equal to or larger than 0.01%; and the concentration or molar percentage of the biomass derivative may be up to the saturated concentration thereof in the system. Theoretically, the biomass derivative may be further added without any theoretical and economy values.

To solve the third technical problem, the present invention provides a system for photocatalytically reforming biomass derivatives to generate hydrogen containing the semiconductor photocatalyst of M~N-$A_x$, which comprises the following components:

1) quantum dots composed of group II~VI elements or group III~V elements; and 2) one or a mixture of two or more selected from group consisting of a cobalt salt, a cobalt complex, a nickel salt, a nickel complex, an iron salt, an iron complex, a copper salt and a chromium salt, or a solution of a salt of Pd, Pt, Ru, Rh, Ir, Au or Ag;

3) an aqueous solution of a biomass derivative;

and includes the following conditions:

a pH of 3~10; and

UV and/or visible light irradiation.

The present invention provides a system for photocatalytically reforming biomass derivatives to generate hydrogen containing the semiconductor photocatalyst of $TiO_2$-M~N-$A_x$, $SnO_2$-M~N-$A_x$ or ZnO-M~N-$A_x$, which includes the following materials:

1) quantum dots composed of group II~VI elements or group III~V elements;

2) $TiO_2$, $SnO_2$ or ZnO;

3) one or a mixture of two or more selected from group consisting of a cobalt salt, a cobalt complex, a nickel salt, a nickel complex, an iron salt, an iron complex, a copper salt and a chromium salt, or a solution of a salt of Pd, Pt, Ru, Rh, Ir, Au or Ag;

4) an aqueous solution of a biomass derivative;

and includes the following conditions:

under basic condition and irradiation of UV and/or visible light.

Preferably, the quantum dots composed of group II~VI elements or group III~V elements have a concentration larger than $1\times10^{-4}$ g/L; and the concentration of the quantum dots refers to that of a system which has added all the materials into the reactor and fixed the volume.

The quantum dots composed of group II~VI elements includes the composite quantum dots composed of one or two or more selected from the group consisting of CdS, CdSe, CdTe, PbS, PbSe, ZnS and ZnSe The quantum dots composed of group III~V elements includes the composite quantum dots composed of one or two selected from the group consisting of InP and InAs.

Preferably, the solution of the salts or complexes of Co, Ni, Fe, Cu, Cr, Pd, Pt, Ru, Rh, Ir, Au or Ag has a concentration equal to or larger than $1\times10^{-6}$ mol/L, that is, the concentration of the salts or complexes of Co, Ni, Fe, Cu, Cr, Pd, Pt, Ru, Rh, Ir, Au or Ag in the whole reaction system may be up to the saturated concentration of the salts or complexes of Co, Ni, Fe, Cu, Cr, Pd, Pt, Ru, Rh, Ir, Au or Ag. Theoretically, the salts or complexes of Co, Ni, Fe, Cu, Cr, Pd, Pt, Ru, Rh, Ir, Au or Ag may be further added without any theoretical and economy values.

The cobalt salt may be cobalt halide, cobalt sulphate, cobalt nitrate, cobalt carbonate, cobalt oxalate, cobalt acetate, cobalt phosphate or cobalt chromate.

The cobalt complex may be cobalt-ammonia complex ($[Co(NH_3)_6]^{3+}$), cobalt-cyanogen complex ($[Co(CN)_6]^{4-}$), cobalt-thiocyanate complex ($[Co(SCN)_4]^{2-}$), cobalt-carbonyl complex ($[Co(CO)_4]^-$), cobalt-nitrate complex ($[Co(NO_3)_4]^{2-}$), cobalt-nitrite complex ($[Co(NO_2)_6]^{3-}$) or cobalt-diacetyldioxime complex; wherein the cobalt-diacetyldioxime complex and derivatives thereof have the following formulae:

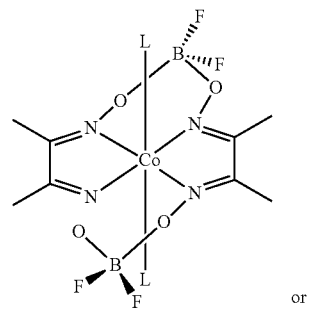

or

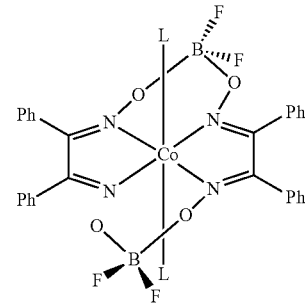

or

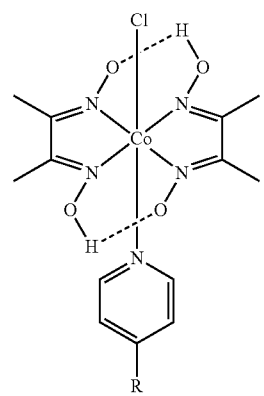

or

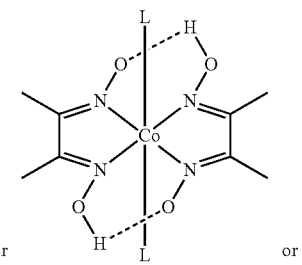

or

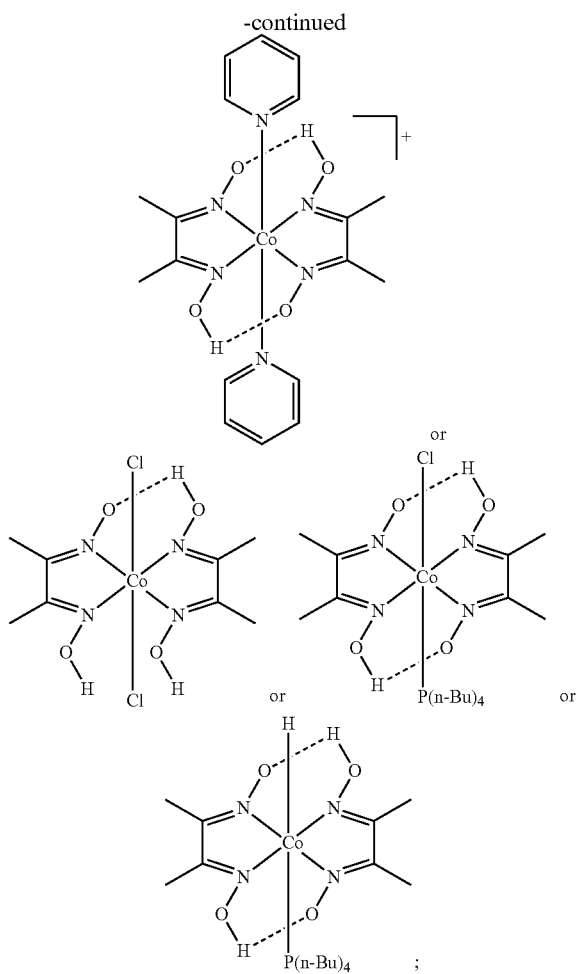

wherein, L is $H_2O$ or $CH_3CN$; R is H, $N(CH_3)_2$ or $(COOCH_3)$.

The nickel salt may be nickel halide, nickel sulphate, nickel nitrate, nickel carbonate, nickel oxalate, nickel acetate, nickel phosphate or nickel chromite.

The nickel complex may be nickel-ammonia complex [Ni$(NH_3)_6]^{2+}$), nickel-cyanogen complex ([Ni$(CN)_4]^{2-}$), nickel-chelate ([Ni(en)$_3]^{2+}$), nickel-carbonyl complex (Ni$(CO)_4$), nickel-ethyl complex ($C_2H_5)_2$Ni).

The iron salt may be iron halide, iron sulphate, iron nitrate, iron carbonate, iron oxalate, iron acetate, iron phosphate, iron chromate, ferrous halide, ferrous sulphate, ferrous nitrate, ferrous carbonate, ferrous oxalate, ferrous acetate, ferrous phosphate, ferrous chromate or ferrous ammonium sulphate.

The iron complex may be iron-cyanogen complex ([Fe$(CN)_6]^{3-}$), ferrous-cyanogen complex ([Fe$(CN)_6]^{4-}$), iron-thiocyanate complex ([Fe$(SCN)_3$]), iron-sulfur complex ([Fe$_2S_2(CO)_6$]), iron-carbonyl complex (Fe$(CO)_5$), iron-carbonyl complex (Fe$_2(CO)_9$), or iron-carbonyl complex (Fe$_3(CO)_{12}$).

The copper salt may be copper halide, copper sulphate (pentahydrate, monohydrate or anhydrous), copper nitrate, copper carbonate, copper oxalate, copper acetate, copper phosphate, copper chromate, copper pyrophosphate, copper cyanide, copper stearate, copper naphthenate, cuprous halide, cuprous sulphate, cuprous carbonate, or cuprous acetate.

The chromium salt may be chromium halide, chromium sulphate, chromium nitrate, chromium carbonate, chromium oxalate, chromium acetate, or chromium phosphate.

The palladium salt may be potassium palladochloride, palladium halide, palladium sulphate, palladium nitrate, or palladium acetate.

The platinum salt may be potassium platinochloride, platinum halide, or platinum nitrate.

The ruthenium salt may be ruthenium halide, ruthenium sulphate, ruthenium nitrate, or ruthenium acetate.

The rhodium salt may be rhodium halide, rhodium sulphate, rhodium nitrate, or rhodium acetate.

The gold salt may be gold halide or chloroauric acid.

The silver salt may be silver halide, silver sulphate, silver nitrate, or silver acetate.

Preferably, the biomass derivative has a concentration equal to or larger than $1 \times 10^{-4}$ mol/L or a molar percentage of equal to or larger than 0.01%; and the concentration or molar percentage of the biomass derivative may be up to the saturated concentration thereof in the system. Theoretically, the biomass derivative may be further added without any theoretical and economy values. The biomass derivative may be methanol, ethanol, propanol, butanol, ethylene glycol, glycerol, glucose, sucrose, fructose, maltose, mannose, ascorbic acid, L-proline or L-cysteine.

To solve the Fourth technical problem, the present invention provides a method for photocatalytically reforming biomass derivatives to generate hydrogen using the semiconductor photocatalyst of M~N-$A_x$, comprising the following steps:

1) introducing quantum dots composed of group II~VI elements or group III~V elements into a reactor;

2) introducing into the reactor one or more selected from group consisting of a cobalt salt, a nickel salt, an iron salt, a cobalt complex, a nickel complex, an iron complex, a copper salt and a chromium salt, or a salt of Pd, Pt, Ru, Rh, Ir, Au or Ag, to obtain a mixed solution A;

3) introducing an aqueous solution of a biomass derivative into the mixed solution A to give a mixed solution B;

4) adjusting the pH value of the mixed solution B to 3~10 to provide a mixed solution C, wherein the pH is adjusted by dropwise addition of 1 mol/L NaOH or 1 mol/L HCl;

5) degassing the solution C of step 4) with an inert gas or vacuumizing the reactor; and irradiating the reactor with UV light, visible light or a mixed beam of UV and visible light under inert gas or vacuum atmosphere to prepare a catalyst in situ, which can be used for photocatalytically reforming biomass derivatives to generate hydrogen.

The biomass derivatives may be methanol, ethanol, propanol, butanol, ethylene glycol, glycerol, glucose, sucrose, fructose, maltose, mannose, ascorbic acid, L-proline or L-cysteine.

The present invention provides a method for photocatalytically reforming biomass derivatives to generate hydrogen using the semiconductor photocatalyst of $TiO_2$-M~N-$A_x$, $SnO_2$-M~N-$A_x$ or ZnO-M~N-$A_x$, comprising the following steps:

1) introducing quantum dots composed of group II~VI elements or group III~V elements into a reactor, then adding $TiO_2$, $SnO_2$ or ZnO, adjusting pH≥7, centrifuging and discarding the supernatant to keep the precipitates;

2) introducing into the precipitates one or two or more selected from group consisting of a cobalt salt, a cobalt complex, a nickel salt, a nickel complex, an iron salt, an iron complex, a copper salt and a chromium salt, or a solution of a salt of Pd, Pt, Ru, Rh, Ir, Au or Ag;

3) introducing an aqueous solution of a biomass derivative into the precipitates, and adjusting pH≥7;

4) irradiating the reactor with UV and/or visible light under inert gas or vacuum atmosphere to prepare a composite semiconductor photocatalyst, which can be used for photocatalytically reforming biomass derivatives to generate hydrogen.

The biomass derivatives may be triethanolamine, triethylamine, methanol, ethanol, propanol, butanol, ethylene glycol, glycerol, glucose, sucrose, fructose, maltose or mannose. Preferably, the quantum dots composed of group II~VI elements or group III~V elements in step 1) have the concentration larger than $1 \times 10^{-4}$ g/L; and the concentration of the quantum dots refers to that of a system, which has added all the materials into the reactor and fixed the volume.

The quantum dots composed of group II~VI elements includes the composite quantum dots composed of one or two or more selected from the group consisting of CdS, CdSe, CdTe, PbS, PbSe, ZnS and ZnSe.

The quantum dots composed of group III~V elements includes the composite quantum dots composed of one or two selected from the group consisting of InP and InAs.

Preferably, the solution of the salts or complexes of Co, Ni, Fe, Cu, Cr, Pd, Pt, Ru, Rh, Ir, Au or Ag in step 2) has a concentration of equal to or larger than $1 \times 10^{-6}$ mol/L, that is, the concentration of the salts or complexes of Co, Ni, Fe, Cu, Cr, Pd, Pt, Ru, Rh, Ir, Au or Ag in the whole reaction system may be up to the saturated concentration of the salts or complexes of Co, Ni, Fe, Cu, Cr, Pd, Pt, Ru, Rh, Ir, Au or Ag. Theoretically, the salts or complexes of Co, Ni, Fe, Cu, Cr, Pd, Pt, Ru, Rh, Ir, Au or Ag may be further added without any theoretical and economic values.

The cobalt salt may be cobalt halide, cobalt sulphate, cobalt nitrate, cobalt carbonate, cobalt oxalate, cobalt acetate, cobalt phosphate or cobalt chromate.

The cobalt complex may be cobalt-ammonia complex ($[Co(NH_3)_6]^{3+}$), cobalt-cyanogen complex ($[Co(CN)_6]^{4-}$), cobalt-thiocyanate complex ($[Co(SCN)_4]^{2-}$), cobalt-carbonyl complex ($[Co(CO)_4]^-$), cobalt-nitrate complex ($[Co(NO_3)_4]^{2-}$), cobalt-nitrite complex ($[Co(NO_2)_6]^{3-}$) or cobalt-diacetyldioxime complex; wherein the cobalt-diacetyldioxime complex and derivatives thereof have the following formulae:

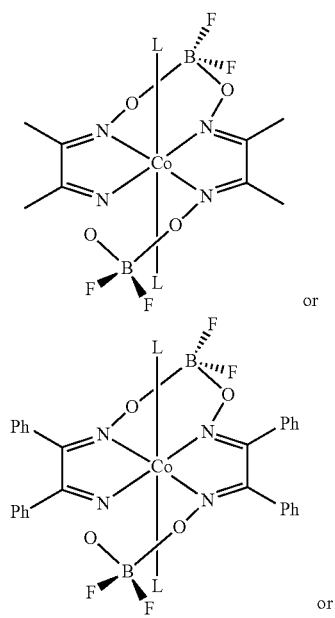

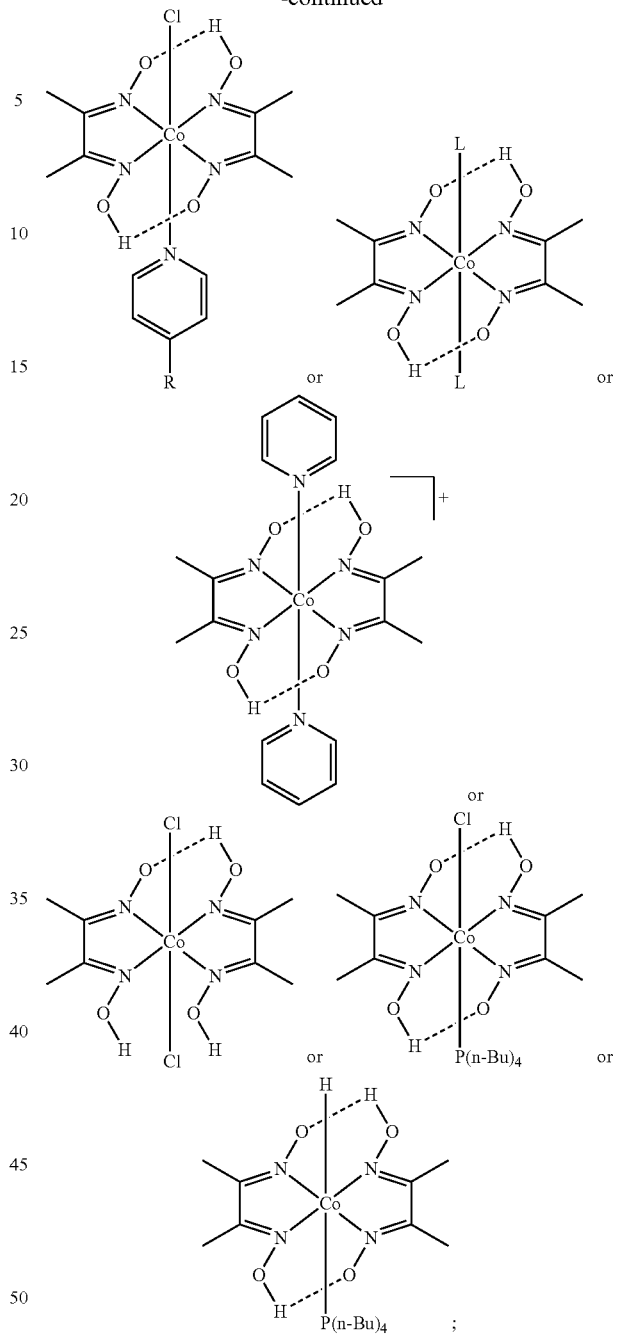

wherein, L is $H_2O$ or $CH_3CN$; R is H, $N(CH_3)_2$ or $(COOCH_3)$.

The nickel salt may be nickel halide, nickel sulphate, nickel nitrate, nickel carbonate, nickel oxalate, nickel acetate, nickel phosphate or nickel chromite.

The nickel complex may be nickel-ammonia complex ($[Ni(NH_3)_6]^{2+}$), nickel-cyanogen complex ($[Ni(CN)_6]^{2-}$), nickel-chelate ($[Ni(en)_3]^{2+}$), nickel-carbonyl complex ($Ni(CO)_4$), nickel-ethyl complex ($(C_2H_5)_2Ni$).

The iron salt may be iron halide, iron sulphate, iron nitrate, iron carbonate, iron oxalate, iron acetate, iron phosphate, iron chromate, ferrous halide, ferrous sulphate, ferrous nitrate, ferrous carbonate, ferrous oxalate, ferrous acetate, ferrous phosphate, ferrous chromate or ferrous ammonium sulphate.

The iron complex may be iron-cyanogen complex ($[Fe(CN)_6]^{3-}$), ferrous-cyanogen complex ($[Fe(CN)_6]^{4-}$), iron-thiocyanate complex ($[Fe(SCN)_3]$), iron-sulfur complex ($[Fe_2S_2(CO)_6]$), iron-carbonyl complex ($Fe(CO)_5$), iron-carbonyl complex ($Fe_2(CO)_9$), or iron-carbonyl complex ($Fe_3(CO)_{12}$).

The copper salt may be copper halide, copper sulphate (pentahydrate, monohydrate or anhydrous), copper nitrate, copper carbonate, copper oxalate, copper acetate, copper phosphate, copper chromate, copper pyrophosphate, copper cyanide, copper stearate, copper naphthenate, cuprous halide, cuprous sulphate, cuprous carbonate, or cuprous acetate.

The chromium salt may be chromium halide, chromium sulphate, chromium nitrate, chromium carbonate, chromium oxalate, chromium acetate, or chromium phosphate.

The palladium salt may be potassium palladochloride, palladium halide, palladium sulphate, palladium nitrate, or palladium acetate.

The platinum salt may be potassium platinochloride, platinum halide, or platinum nitrate.

The ruthenium salt may be ruthenium halide, ruthenium sulphate, ruthenium nitrate, or ruthenium acetate.

The rhodium salt may be rhodium halide, rhodium sulphate, rhodium nitrate, or rhodium acetate.

The gold salt may be gold halide or chloroauric acid.

The silver salt may be silver halide, silver sulphate, silver nitrate, or silver acetate.

Preferably, the biomass derivative in step 3) has a concentration equal to or larger than $1 \times 10^{-4}$ mol/L or a molar percentage of equal to or larger than 0.01%; and the concentration or molar percentage of the biomass derivative may be up to the saturated concentration thereof in the system Theoretically, the biomass derivative may be further added without any theoretical and economic values.

The refoiniing of biomass refers to the reformation and decomposition of biomass derivatives (mainly composed of C, H and O) into $H_2$ and other small molecules, like $CO_2$, CO, $CH_4$, and so on, meanwhile, there are many intermediates left in the reaction solution. It should be explained that the kind and the ratio of the products are different with respect to different reaction materials.

The intermediates that may be generated in the reaction solution are complex, and both the species and the ratio of the products may differ a lot with different biomass derivatives, different reaction conditions (concentration, temperature, pH and so on) and different quantum dots, which are not listed here in detail, but it is for sure that $H_2$ and $CO_2$ are the main products.

The present invention has the following advantages.

The present invention can prepare a highly efficient semiconductor photocatalyst for photocatalytically reforming biomass derivatives to generate hydrogen through a photochemical method in situ from quantum dots and the salts or complexes of transition metals, particularly cheap transition metals such as nickel, cobalt and iron under mild conditions. More importantly, the method of the present invention can prepare a semiconductor photocatalyst in situ, which is highly efficient, stable, cheap and easily made under light irradiation without any severe conditions such as calcination. The method of the present invention is efficient in reaction, simple in operation, cheap and practical for application.

BEST MODE FOR CARRYING OUT THE INVENTION

The present invention will be further explained with reference to the following Examples, but is not limited thereto.

Figure 1:
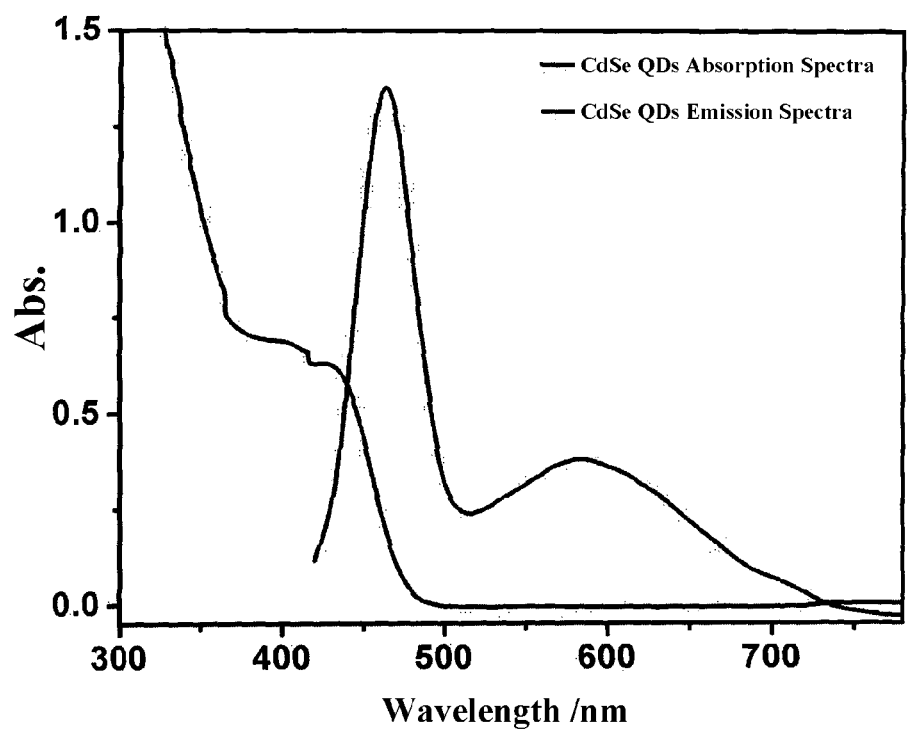
FIG. 1 shows the UV-Vis absorption and emission ($\lambda_{ex}=400$ nm) spectra of CdSe quantum dots in the present invention.
Figure 2:
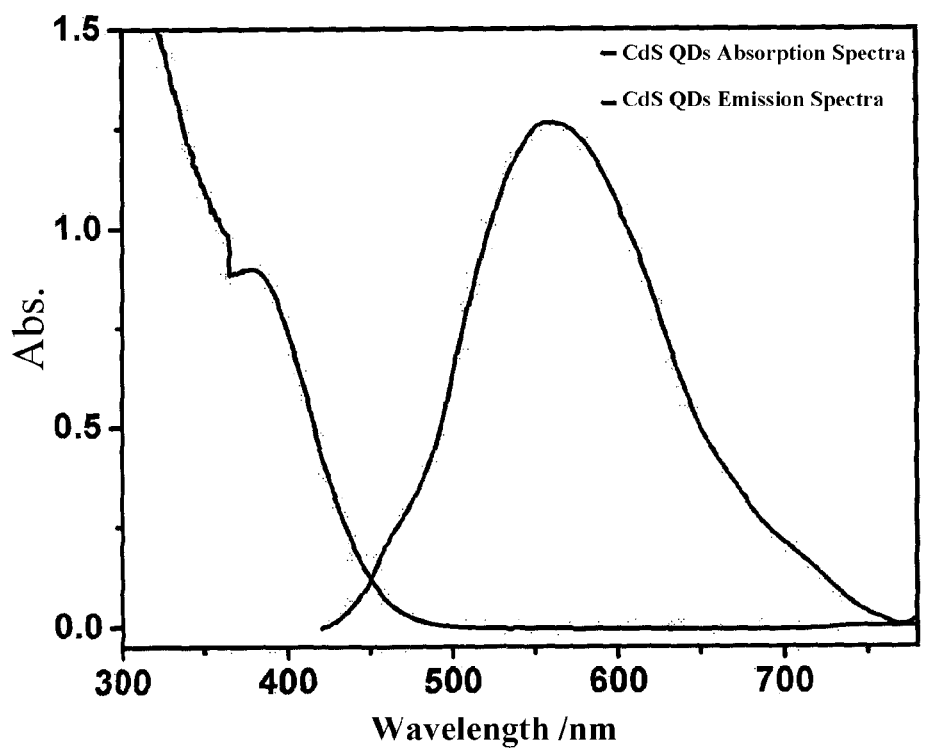
FIG. 2 shows the UV-Vis absorption and emission ($\lambda_{ex}=400$ nm) spectra of CdS quantum dots in the present invention.
Figure 3:
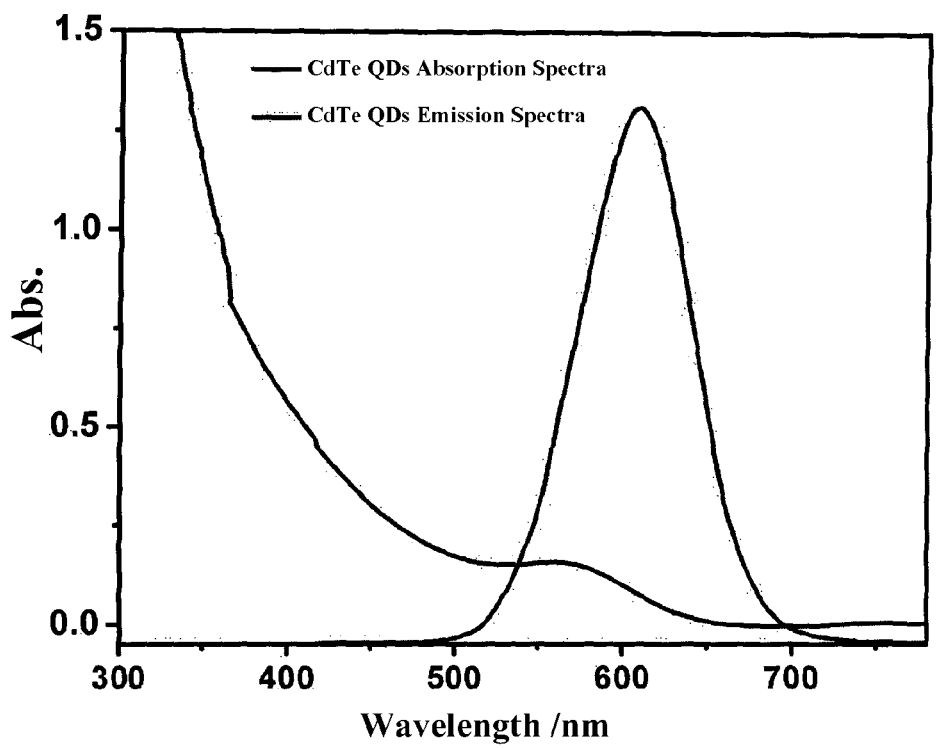
FIG. 3 shows the UV-Vis absorption and emission ($\lambda_{ex}=400$ nm) spectra of CdTe quantum dots in the present invention.

FIGS. 1, 2 and 3 show the UV-Vis absorption and emission spectra of CdSe, CdS and CdTe quantum dots, respectively, in the present invention. As can be seen from the figures, the first absorption peaks appear at 430 nm for CdSe quantum dots, 430 nm for CdS quantum dots and 556 nm for CdTe quantum dots, respectively; and under excitation of 400 nm light, the CdSe quantum dots have an emission peak at 470 nm attributing to band-edge emission and an emission peak at 600 nm attributing to defect emission; the CdS quantum dots have a maximum emission peak at 570 nm and the CdTe quantum dots has a maximum emission peak at 630 nm.

Figure 4:
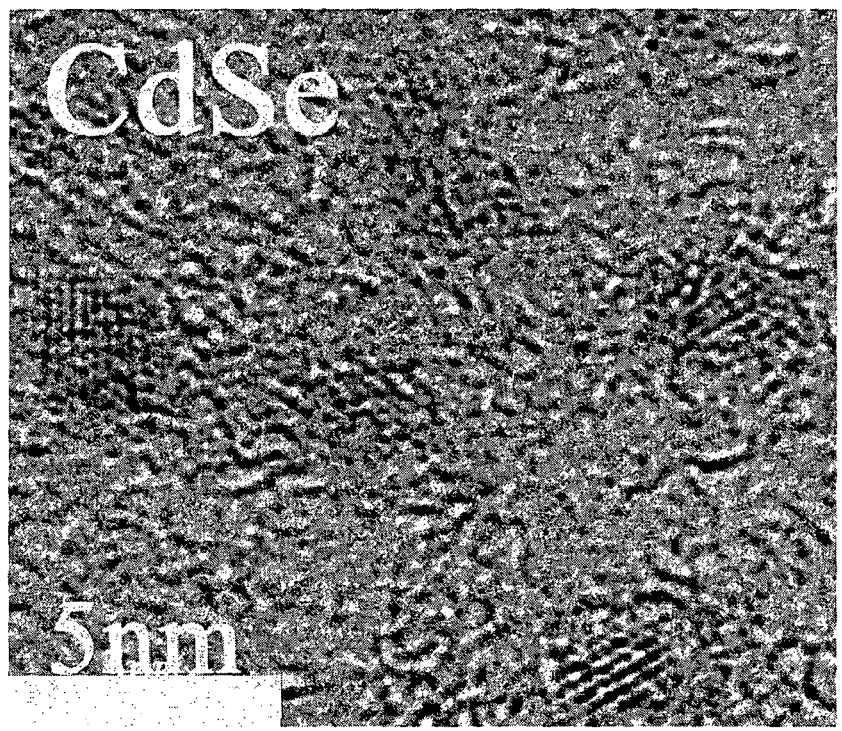
FIG. 4 shows the HRTEM (high resolution transmission electron microscopy) image of CdSe quantum dots in the present invention.
Figure 5:
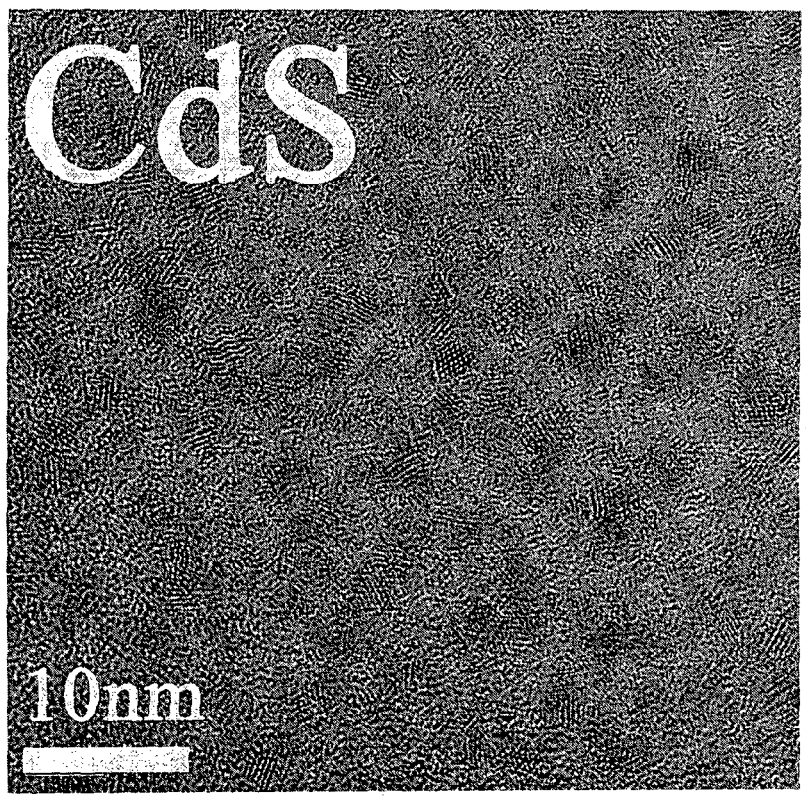
FIG. 5 shows the HRTEM image of CdS quantum dots in the present invention.
Figure 6:
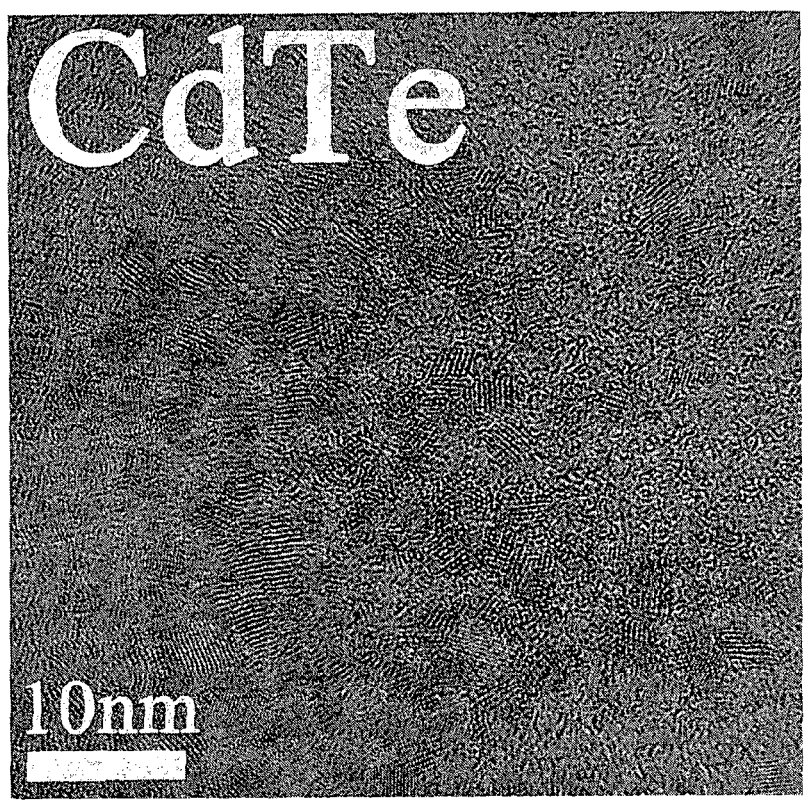
FIG. 6 shows the HRTEM image of CdTe quantum dots in the present invention.

FIGS. 4, 5 and 6 show HRTEM images of CdSe, CdS and CdTe quantum dots deposited on ultra-thin carbon film after ultrasonic dispersion in water, respectively. It can be seen from the figures that the average size is 2.3±0.3 nm for CdSe quantum dots, 2.3±0.3 nm for CdS quantum dots, and 3.4±0.3 nm for CdTe quantum dots, respectively. It should be explained that the size of the quantum dots could be adjusted by controlling the reaction time during synthesis.

Example 1

A method for photocatalytically reforming a biomass derivative using a semiconductor photocatalyst to generate hydrogen:

$1 \times 10^{-1}$ g/L of CdSe quantum dots (the concentration of CdSe stock solution: $2 \times 10^{-1}$ g/L) was added into a Pyrex tube, followed by addition of 0.5 mL of $CoCl_2$ aqueous solution (original concentration: $4.2 \times 10^{-3}$ mol/L, containing 0.5 mg of $CoCl_2 \cdot 6H_2O$) and 4 mL of methanol (original concentration: 24.75 mol/L at 20° C.). Then the pH was adjusted to 4, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector).

After irradiation, synthesized in situ was a semiconductor material with a hollow sphere structure having an outer diameter of 10~20 nm and a shell thickness of 2~5 nm. The semiconductor photocatalyst has a formula of $CdCo_xSe$, wherein x was determined to 0.13% through ICP (inductive coupled plasma emission spectrometer).

Example 2

A method for photocatalytically reforming a biomass derivative using a semiconductor photocatalyst to generate hydrogen:

$1 \times 10^{-1}$ g/L of CdSe quantum dots (the concentration of CdSe stock solution: $2 \times 10^{-1}$ g/L) was added into a Pyrex tube, followed by addition of 0.5 mL of $CoCl_2$ aqueous solution (original concentration: $4.2 \times 10^{-3}$ mol/L, containing 0.5 mg of $CoCl_2 \cdot 6H_2O$) and 4 mL of ethanol (original concentration: 17.16 mol/L at 20° C.). Then the pH was adjusted to 5, and the total volume was adjusted to 10 mL. The tube was sealed under nitrogen atmosphere and irradiated with a 500 W high pressure mercury lamp using a 400 nm long wave pass glass filter.

Figure 7:
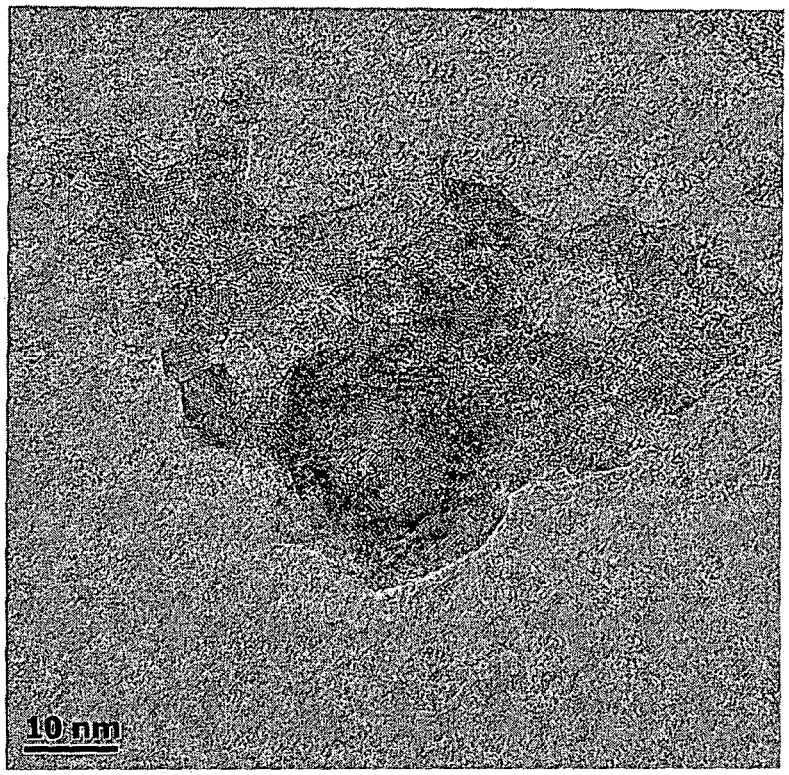
FIG. 7 shows the HRTEM (high resolution transmission electron microscopy) image of the photocatalysts prepared in situ under light irradiation from CdSe quantum dots of Example 2 as well as the salt of cobalt, nickel or iron and biomass derivative.

FIG. 7 shows the HRTEM image of the photocatalyst prepared in example 2 deposited on ultra-thin carbon film after ultrasonically dispersed in ethanol. The HRTEM images of photocatalyst prepared in other examples of CdSe have similar morphologies and thus are not presented respectively.

As can be seen from the figure, after irradiation, synthesized in situ was a semiconductor material with a hollow sphere structure having an outer diameter of 10~20 nm and a shell thickness of 2~5 nm. The semiconductor photocatalyst has a formula of $CdCo_xSe$, wherein x was determined to 0.16% through ICP (inductive coupled plasma emission spectrometer).

Figure 11:
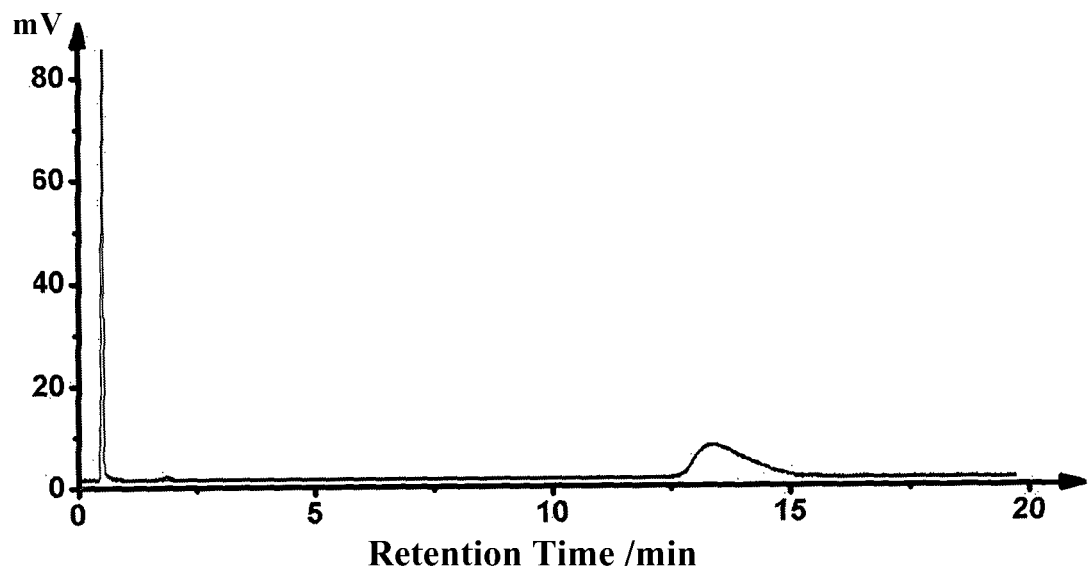
FIG. 11 shows the GC (gas chromatography) spectra of the gas phase collected after the photocatalytically reforming methanol system of Example 2.

Ethanol can be prepared in large scale from fermentation of biomass, and therefore, it is of practical interest to photocatalytically reforming of ethanol to generate hydrogen. During the reformation of ethanol aqueous solution, ethanol was first oxidized to acetaldehyde during the initial stage of the photocatalytic reaction, and meanwhile $H^+$ was reduced to $H_2$. The acetaldehyde reacted with water to generate acetic acid, which was finally oxidized to $CO_2$ and $H_2$. Besides, acetaldehyde could react with hydroxyl radicals to yield $CO_2$ and $H_2$. FIG. 11 shows the GC equipped with TCD (thermal conductivity detector) spectra of the gas phase collected after the photocatalytically reforming ethanol system of Example 2. As can be seen from the figure, $CO_2$ and $H_2$ peaks appeared in sequence at different retention times. The hydrogen generation rate was 73 $\mu mol \cdot h^{-1} \, mg^{-1}$).

Example 3

The method of example 1 was repeated except that the dopant is cobalt sulphate and the biomass derivative is ethanol.

Example 4

The method of example 1 was repeated except that the dopant is cobalt nitrate and the biomass derivative is ethanol.

Example 5

The method of example 1 was repeated except that the dopant is nickel chloride and the biomass derivative is ethanol.

Example 6

The method of example 1 was repeated except that the dopant is nickel sulphate and the biomass derivative is ethanol.

Example 7

The method of example 1 was repeated except that the biomass derivative is sucrose with a concentration of 0.1 mol/L.

Example 8

The method of example 1 was repeated except that the biomass derivative is glucose with a concentration of 0.1 mol/L.

Example 9

The method of example 1 was repeated except that the biomass derivative is glycerol.

Example 10

The method of example 1 was repeated except that the biomass derivative is L-cysteine with a concentration of 0.1 mol/L.

Example 11

A method for photocatalytically reforming a biomass derivative using a semiconductor photocatalyst to generate hydrogen:

Into a Pyrex tube, were added CdSe quantum dots (the concentration of CdSe stock solution: $2\times10^{-1}$ g/L) to be $1\times10^{-4}$ g/L in the whole reaction system, $CoCrO_4$ aqueous solution to be $1\times10^{-6}$ mol/L in the whole reaction system, and ethylene glycol to be $1\times10^{-4}$ mol/L in the whole reaction system. Then the pH was adjusted to 3. The reactor was vacummized and irradiated with a 500 W high pressure mercury lamp using a 400 nm short wave pass glass filter.

Example 12

A method for photocatalytically reforming a biomass derivative using a semiconductor photocatalyst to generate hydrogen:

Into a Pyrex tube, were added CdSe quantum dots (the concentration of CdSe stock solution: $2\times10^{-1}$ g/L) to be $1\times10^{-3}$ g/L in the whole reaction system, Cobalt-nitrate complex ($[Co(NO_3)_4]^{2-}$) to be $1\times10^{-5}$ mol/L in the whole reaction system, and sucrose to be $1\times10^{-3}$ mol/L in the whole reaction system. Then the pH was adjusted to 10. The reactor was sealed under nitrogen atmosphere and irradiated with a 500 W high pressure mercury lamp. The glass tube itself can pass through UV and visible light.

Example 13

A method for photocatalytically reforming a biomass derivative using a semiconductor photocatalyst to generate hydrogen:

Into a Pyrex tube, were added CdSe quantum dots (the concentration of CdSe stock solution: $2\times10^{-1}$ g/L) to be $1\times10^{-2}$ g/L in the whole reaction system, cobalt-nitride complex ($[Co(NO_2)_6]^{3-}$) to be $2.1\times10^{-4}$ mol/L in the whole reaction system, and glucose to be 0.1 mol/L in the whole reaction system. Then the pH was adjusted to 8. The reactor was sealed under nitrogen atmosphere and irradiated with a 500 W high pressure mercury lamp using a 400 nm long wave pass glass filter.

After irradiation, synthesized in situ was a semiconductor material with a hollow sphere structure having an outer diameter of 10~20 nm and a shell thickness of 2~5 nm. The semiconductor photocatalyst has a formula of $CdCo_xSe$, wherein x was determined to be 0.10% through ICP (inductive coupled plasma emission spectrometer).

Example 14

The method of example 1 was repeated except that the dopant is nickel bromide and the biomass derivative is L-proline with a concentration of 0.1 mol/L.

Example 15

The method of example 1 was repeated except that the dopant is nickel sulphate and the biomass derivative is L-cysteine with a concentration of 0.1 mol/L.

Example 16

The method of example 1 was repeated except that the dopant is nickel oxalate and the biomass derivative is propanol.

Example 17

The method of example 1 was repeated except that the dopant is nickel acetate and the biomass derivative is n-butanol.

Example 18

The method of example 1 was repeated except that the dopant is nickel phosphate.

Example 19

The method of example 1 was repeated except that the dopant is nickel-ammonia complex, $[Ni(NH_3)_6]^{2+}$.

Example 20

The method of example 1 was repeated except that the dopant is nickel-cyanogen complex, $[Ni(CN)_4]^{2-}$.

Example 21

The method of example 1 was repeated except that the dopant is nickel-chelate, $[Ni(en)_3]^{2+}$.

Example 22

The method of example 1 was repeated except that the dopant is nickel tetracarbonyl, $Ni(CO)_4$.

Example 23

The method of example 1 was repeated except that the dopant is nickel-ethyl complex, $(C_2H_5)_2Ni$.

Example 24

The method of example 1 was repeated except that the dopant is iron chloride.

Example 25

The method of example 1 was repeated except that the dopant is ferrous chloride.

Example 26

The method of example 1 was repeated except that the dopant is ferrous bromide.

Example 27

The method of example 1 was repeated except that the dopant is ferrous sulphate.

Example 28

The method of example 1 was repeated except that the dopant is iron fluoride.

Example 29

The method of example 1 was repeated except that the dopant is iron bromide.

Example 30

The method of example 1 was repeated except that the dopant is iron iodide.

Example 31

The method of example 1 was repeated except that the dopant is iron sulphate.

Example 32

The method of example 1 was repeated except that the dopant is iron nitrate.

Example 33

The method of example 1 was repeated except that the dopant is iron carbonate.

Example 34

The method of example 1 was repeated except that the dopant is iron oxalate.

Example 35

The method of example 1 was repeated except that the dopant is iron acetate.

Example 36

The method of example 1 was repeated except that the dopant is iron phosphate.

Example 37

The method of example 1 was repeated except that the dopant is iron chromate.

Example 38

The method of example 1 was repeated except that the dopant is ferrous fluoride.

Example 39

The method of example 1 was repeated except that the dopant is ferrous iodide.

Example 40

The method of example 1 was repeated except that the dopant is ferrous nitrate.

Example 41

The method of example 1 was repeated except that the dopant is ferrous carbonate.

Example 42

The method of example 1 was repeated except that the dopant is ferrous oxalate.

Example 43

The method of example 1 was repeated except that the dopant is ferrous acetate.

Example 44

The method of example 1 was repeated except that the dopant is ferrous phosphate.

Example 45

The method of example 1 was repeated except that the dopant is ferrous chromate.

Example 46

The method of example 1 was repeated except that the dopant is ferrous ammonium sulphate.

Example 47

The method of example 1 was repeated except that the dopant is ferrous ammonium sulphate.

Example 48

The method of example 1 was repeated except that the dopant is iron-cyanogen complex, $[Fe(CN)_6]^{3-}$.

Example 49

The method of example 1 was repeated except that the dopant is ferrous-cyanogen complex, $[Fe(CN)_6]^{4-}$.

Example 50

The method of example 1 was repeated except that the dopant is iron-thiocyanate complex, $Fe(SCN)_3$.

Example 51

The method of example 1 was repeated except that the dopant is iron-carbonyl complex, $Fe(CO)_5$.

Example 52

The method of example 1 was repeated except that the dopant is iron-carbonyl complex, $Fe_2(CO)_9$.

Example 53

The method of example 1 was repeated except that the dopant is iron-carbonyl complex, $Fe_3(CO)_{12}$.

Example 54

The method of example 1 was repeated except that the dopant is nickel nitrate.

Example 55

The method of example 1 was repeated except that the dopant is nickel carbonate.

Example 56

The method of example 1 was repeated except that the dopant is nickel chromite.

Example 57

The method of example 1 was repeated except that the dopant is nickel fluoride.

Example 58

The method of example 1 was repeated except that the dopant is nickel iodide.

Example 59

The method of example 1 was repeated except that the dopant is cobalt fluoride.

Example 60

The method of example 1 was repeated except that the dopant is cobalt bromide.

Example 61

The method of example 1 was repeated except that the dopant is cobalt iodide.

Example 62

The method of example 1 was repeated except that the dopant is cobalt carbonate.

Example 63

The method of example 1 was repeated except that the dopant is cobalt oxalate.

Example 64

The method of example 1 was repeated except that the dopant is cobalt acetate.

Example 65

The method of example 1 was repeated except that the dopant is cobalt phosphate.

Example 66

The method of example 1 was repeated except that the dopant is cobalt-ammonia complex, $[Co(NH_3)_6]^{3+}$.

Example 67

The method of example 1 was repeated except that the dopant is cobalt-cyanogen complex, $[Co(CN)_6]^{4-}$.

Example 68

The method of example 1 was repeated except that the dopant is cobalt-thiocyanate complex, $[Co(SCN)_4]^{2-}$.

Example 69

The method of example 1 was repeated except that the dopant is cobalt-carbonyl complex, $[Co(CO)_4]^{-}$.

Example 70

The method of example 1 was repeated except that the dopant is cobalt-nitrate complex, $[Co(NO_3)_4]^{2-}$.

Example 71

The method of example 1 was repeated except that the dopant is cobalt-nitrite complex, $[Co(NO_2)_6]^{3-}$.

Example 72

The method of example 1 was repeated except that the dopant is cobalt-diacetyldioxime complex represented by the following structure:

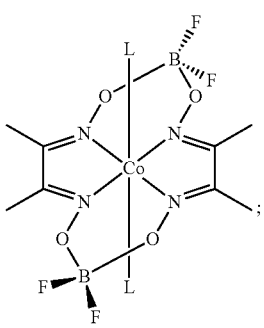

wherein $L=H_2O$.

Example 73

The method of example 1 was repeated except that the dopant is cobalt-diacetyldioxime complex represented by the following structure:

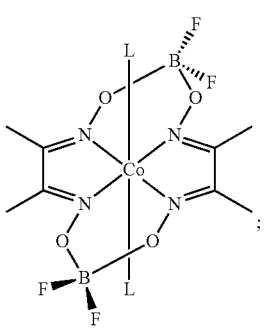

wherein $L=CH_3CN$.

Example 74

The method of example 1 was repeated except that the dopant is cobalt-diacetyldioxime complex represented by the following structure:

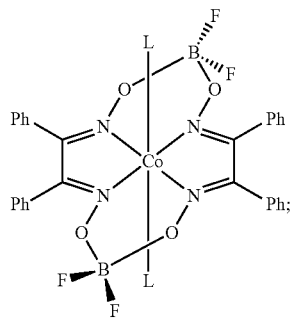

wherein L=H$_2$O.

Example 75

The method of example 1 was repeated except that the dopant is cobalt-diacetyldioxime complex represented by the following structure:

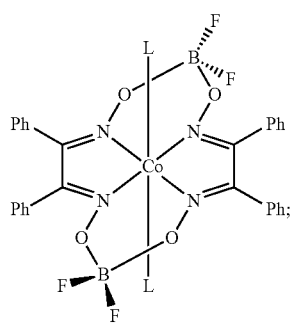

wherein L=CH$_3$CN.

Example 76

The method of example 1 was repeated except that the dopant is cobalt-diacetyldioxime complex represented by the following structure:

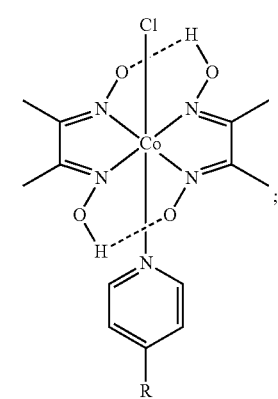

wherein R=H.

Example 77

The method of example 1 was repeated except that the dopant is cobalt-diacetyldioxime complex represented by the following structure:

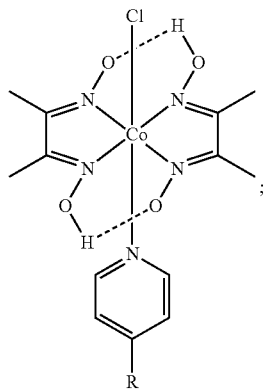

wherein R=N(CH$_3$)$_2$.

Example 78

The method of example 1 was repeated except that the dopant is cobalt-diacetyldioxime complex represented by the following structure:

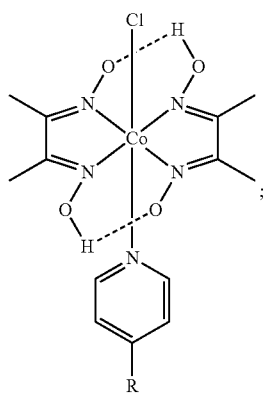

wherein R=COOCH$_3$.

Example 79

The method of example 1 was repeated except that the dopant is cobalt-diacetyldioxime complex represented by the following structure:

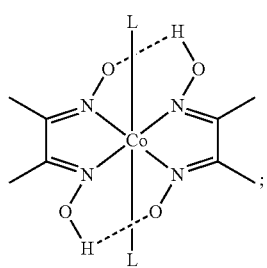

wherein. L=H$_2$O.

Example 80

The method of example 1 was repeated except that the dopant is cobalt-diacetyldioxime complex represented by the following structure:

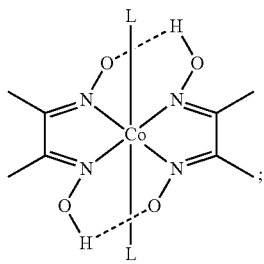

wherein L=CH₃CN.

Example 81

The method of example 1 was repeated except that the dopant is cobalt-diacetyldioxime complex represented by the following structure:

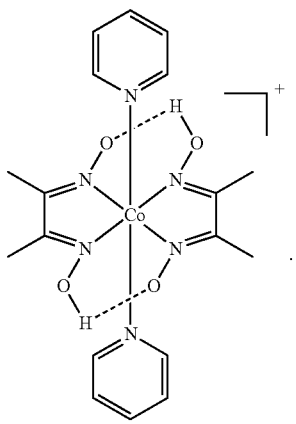

Example 82

The method of example 1 was repeated except that the dopant is cobalt-diacetyldioxime complex represented by the following structure:

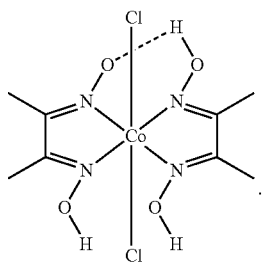

Example 83

The method of example 1 was repeated except that the dopant is cobalt-diacetyldioxime complex represented by the following structure:

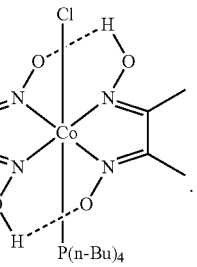

Example 84

The method of example 1 was repeated except that the dopant is cobalt-diacetyldioxime complex represented by the following structure:

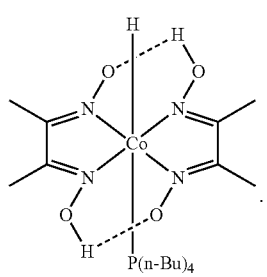

Example 85

A method for photocatalytically reforming a biomass derivative using a semiconductor photocatalyst to generate hydrogen:

$1\times10^{-1}$ g/L of CdS quantum dots (the concentration of CdS stock solution: 1 g/L) was added into a Pyrex tube, followed by addition of 0.5 mL of $CoCl_2$ aqueous solution (original concentration: $4.2\times10^{-3}$ mol/L, containing 0.5 mg of $CoCl_2.6H_2O$) and 4 mL of ethanol (original concentration: 17.16 mol/L at 20° C.). Then the pH was adjusted to 8, and the total volume was adjusted to 10 mL. The tube was sealed under nitrogen atmosphere and irradiated with a 500 W high pressure mercury lamp using a 400 nm long wave pass glass filter.

Figure 8:
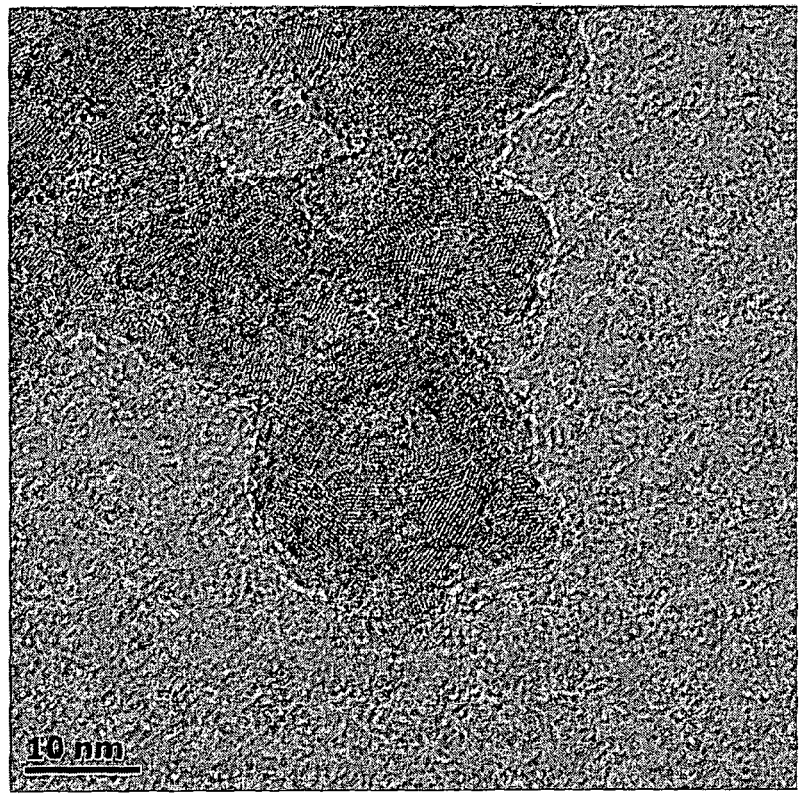
FIG. 8 shows the HRTEM (high resolution transmission electron microscopy) image of the photocatalysts prepared in situ under light irradiation from CdS quantum dots of Example 85 as well as the salt of cobalt, nickel or iron and biomass derivative.

FIG. 8 shows the HRTEM image of the photocatalyst prepared in example 85 deposited on ultra-thin carbon film after ultrasonically dispersed in ethanol. The HRTEM images of the photocatalyst prepared in other examples of CdS have similar morphologies and thus are not presented respectively.

As can be seen from the figure, after irradiation, synthesized in situ was a semiconductor material with a hollow sphere structure having an outer diameter of 10~20 nm and a shell thickness of 2~5 nm. The semiconductor photocatalyst has a formula of $CdCo_xS$, wherein x was determined to be 1.0% through ICP (inductive coupled plasma emission spectrometer).

Figure 12:
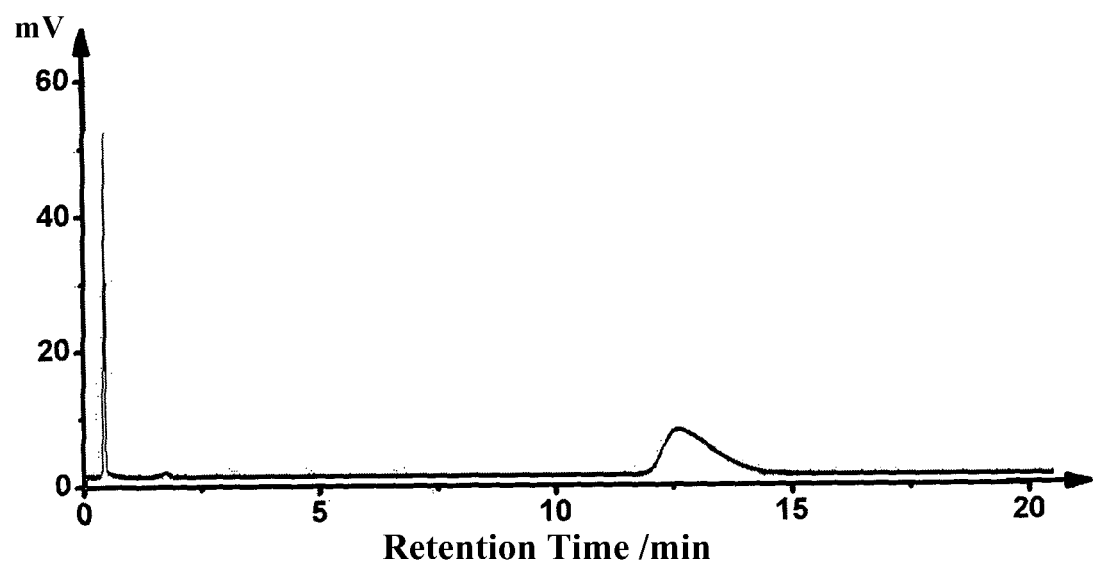
FIG. 12 shows the GC spectra of the gas phase collected after the photocatalytically reforming ethanol system of Example 85.

FIG. 12 shows the GC equipped with TCD (thermal conductivity detector) spectra of the gas phase collected after the photocatalytic reforming of ethanol system of Example 85. As can be seen from the figure, $CO_2$ and $H_2$ peaks appeared in sequence at different retention times. The hydrogen generation rate was 43 $\mu mol \cdot h^{-1} \cdot mg^{-1}$.

Example 86

A method for photocatalytically reforming a biomass derivative using a semiconductor photocatalyst to generate hydrogen:

$1 \times 10^{-1}$ g/L of CdTe quantum dots (the concentration of CdTe stock solution: $2 \times 10^{-1}$ g/L) was added into a Pyrex tube, followed by addition of 0.5 mL of $CoCl_2$ aqueous solution (original concentration: $4.2 \times 10^{-3}$ mol/L, containing 0.5 mg of $CoCl_2 \cdot 6H_2O$) and 4 mL of ethanol (original concentration: 17.16 mol/L at 20° C.). Then the pH was adjusted to 6, and the total volume was adjusted to 10 mL. The tube was sealed under nitrogen atmosphere and irradiated with a 500 W high pressure mercury lamp using a 400 nm long wave pass glass filter.

Figure 13:
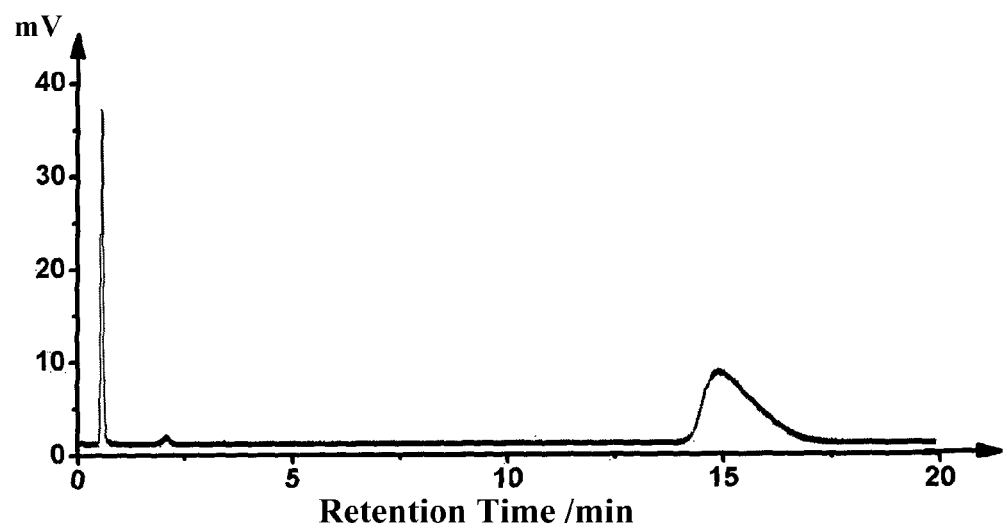
FIG. 13 shows the GC spectra of the gas phase collected after the photocatalytically reforming glucose system of Example 86.

FIG. 13 shows the GC equipped with TCD (thermal conductivity detector) spectra of the gas phase collected after the photocatalytic reforming of ethanol system of Example 86. As can be seen from the figure, $CO_2$ and $H_2$ peaks appeared in sequence at different retention times. The hydrogen generation rate was 8 $\mu mol \cdot h^{-1} \cdot mg^{-1}$.

Example 87

A method for photocatalytically reforming a biomass derivative using a semiconductor photocatalyst to generate hydrogen:

$1 \times 10^{-1}$ g/L of CdTe quantum dots (the concentration of CdTe stock solution: $2 \times 10^{-1}$ g/L) was added into a Pyrex tube, followed by addition of 0.5 mL of $CoCl_2$ aqueous solution (original concentration: $4.2 \times 10^{-3}$ mol/L, containing 0.5 mg of $CoCl_2 \cdot 6H_2O$) and 200 mg of ($1.14 \times 10^{-1}$ mol/L). Then the pH was adjusted to 6, and the total volume was adjusted to 10 mL. The tube was sealed under nitrogen atmosphere and irradiated with a 500 W high pressure mercury lamp using a 400 nm long wave pass glass filter.

Figure 9:
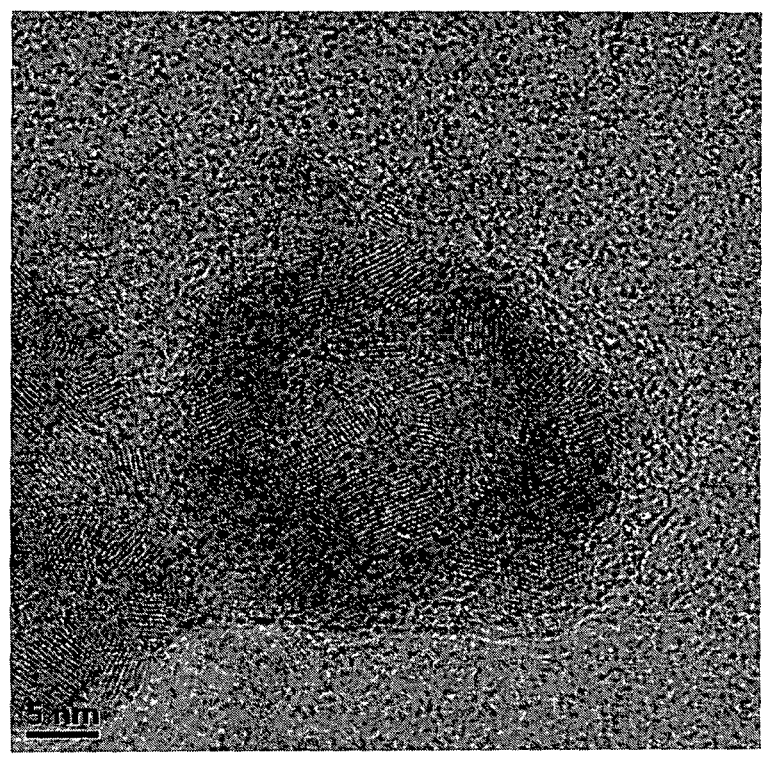
FIG. 9 shows the HRTEM (high resolution transmission electron microscopy) image of the photocatalysts prepared in situ under light irradiation from CdTe quantum dots of Example 87 as well as the salt of cobalt, nickel or iron and biomass derivative.

FIG. 9 shows the HRTEM image of the photocatalyst prepared in example 87 deposited on ultra-thin carbon film after ultrasonically dispersed in ethanol. The HRTEM images of photocatalyst prepared in other examples of CdTe have similar morphologies and thus are not presented respectively.

Figure 10:
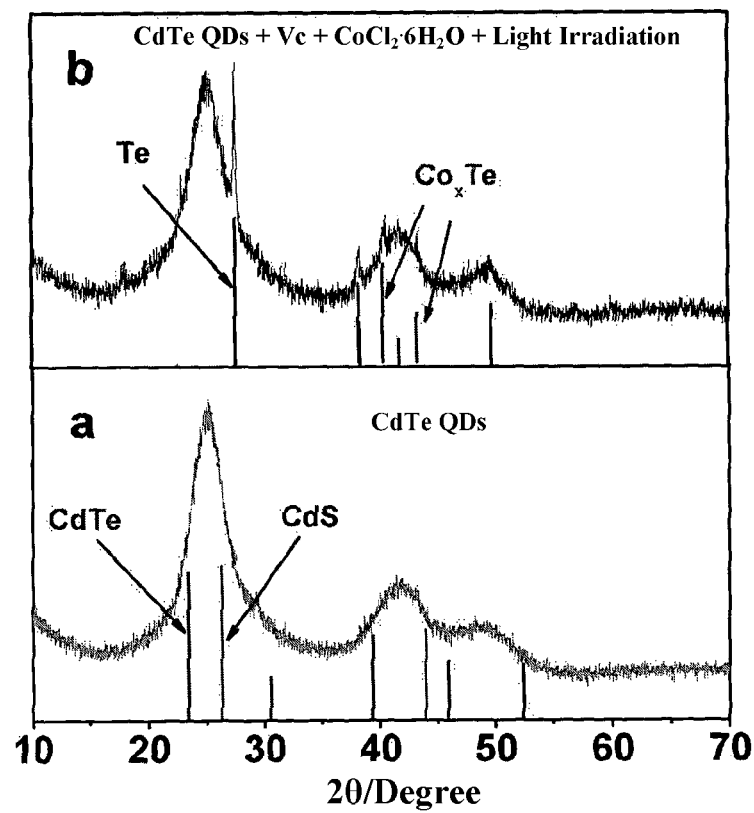
FIG. 10 shows the XRD (powder X-Ray diffraction) image of the CdTe quantum dots and the photocatalysts prepared in situ under light irradiation from CdTe quantum dots of Example 87 as well as the salt of cobalt, nickel or iron and biomass derivative.

As can be seen from the figure, after irradiation, synthesized in situ was a semiconductor material with a hollow sphere structure having an outer diameter of 10~20 nm and a shell thickness of 2~5 nm. XRD patterns in FIG. 10 also show the new peaks of $Co_xTe$ in the hollow structure after irradiation. The semiconductor photocatalyst has a formula of $CdCo_xTe$, wherein x was determined to 0.26% through ICP (inductive coupled plasma emission spectrometer).

Example 88

The method of example 85 was repeated except that the quantum dots are PbS and the biomass derivative is fructose.

Example 89

The method of example 85 was repeated except that the quantum dots are PbSe and the biomass derivative is maltose.

Example 90

The method of example 85 was repeated except that the quantum dots are InP and the biomass derivative is mannose.

Example 91

The method of example 85 was repeated except that the quantum dots are InAs and the biomass derivative is ethanol.

Example 92

The method of example 85 was repeated except that the quantum dots are ZnS and the biomass derivative is ethanol.

Example 93

The method of example 85 was repeated except that the quantum dots are ZnSe and the biomass derivative is ethanol.

TABLE 1

Comparison of the composition and hydrogen generation rate of the systems for hydrogen generation in Example 1-10 and literature

| Item | Quantum dots | Dopant | Biomass derivative | Hydrogen generation rate($\mu mol \cdot h^{-1} \cdot mg^{-1}$) |
|---|---|---|---|---|
| Example 1 | CdSe | $CoCl_2 \cdot 6H_2O$ | $CH_3OH$ | 42 |
| Example 2 | CdSe | $CoCl_2 \cdot 6H_2O$ | $C_2H_5OH$ | 73 |
| Example 3 | CdSe | $CoSO_4$ | $C_2H_5OH$ | 66 |
| Example 4 | CdSe | $CoNO_3$ | $C_2H_5OH$ | 40 |
| Example 5 | CdSe | $NiCl_2 \cdot 6H_2O$ | $C_2H_5OH$ | 59 |
| Example 6 | CdSe | $NiSO_4 \cdot 6H_2O$ | $C_2H_5OH$ | 33 |
| Example 7 | CdSe | $CoCl_2 \cdot 6H_2O$ | sucrose | 2.5 |
| Example 8 | CdSe | $CoCl_2 \cdot 6H_2O$ | glucose | 3 |
| Example 9 | CdSe | $CoCl_2 \cdot 6H_2O$ | glycerol | 25 |
| Example 10 | CdSe | $CoCl_2 \cdot 6H_2O$ | L-cysteine | 12.5 |

| literature | Composition of Catalyst | Source of the literature | Hydrogen generation rate($\mu mol \cdot h^{-1} \cdot mg^{-1}$) |
|---|---|---|---|
| Literature 1 | CdS loaded with 10%Pt(wt %) | Domen. K. et al. *Chem. Mater.* 2008, 20, 110-117. | 27.3 |

TABLE 1-continued

Comparison of the composition and hydrogen generation rate of the systems for hydrogen generation in Example 1-10 and literature

| Literature 2 | CdS loaded with 0.3%Pt%—0.13%PdS (wt %) | Can Li, et al. *Journal of Catalysis*. 2009, 266, 165-168. | 29.2 |

Experimental conditions: quantum dots: CdSe (5 mL, $5 \times 10^{-4}$ M); salts of transition metal: $CoCl_2 \cdot 6H_2O$ ($2.1 \times 10^{-4}$ M), $NiCl_2 \cdot 6H_2O$ ($2.1 \times 10^{-4}$ M), $NiSO_4 \cdot 6H_2O$ ($2.1 \times 10^{-4}$ M), $CoSO_4$ ($2.1 \times 10^{-4}$ M), $CoNO_3$ ($2.1 \times 10^{-4}$ M); biomass: $CH_3OH$ (4 mL), $C_2H_5OH$ (4 mL), sucrose (0.1M), glucose (0.1M), glycerol (4 mL), L-cysteine (0.1M); pH ≥ 4; irradiation: 500 W high pressure mercury lamp with a 400 nm light filter to ensure the passage of visible light; the generated hydrogen was detected by GC (column: 4 Å molecule seize; detector: TCD; internal standard: $CH_4$).

It can be seen from table 1 that the hydrogen generation rates in Example 1-10 of the present invention are larger than those in literature 1 and 2, and meanwhile the example 1 of the present invention has the largest hydrogen generation rate of 73 $\mu mol \cdot h^{-1} \cdot mg^{-1}$.

Example 94

A method for reforming a biomass derivative using a photocatalytic system comprising a composite semiconductor photocatalyst, comprising the following steps:

10 mg of P-25 $TiO_2$, 5 mL of CdSe quantum dots (the concentration of CdSe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 0.5 mL of $CoCl_2$ aqueous solution (original concentration: $4.2 \times 10^{-3}$ mol/L, containing 0.5 mg of $CoCl_2 \cdot 6H_2O$) and 4 mL of methanol (original concentration 24.75 mol/L, 20° C.). Then the pH was adjusted to 11 with 1M NaOH, and the total volume was adjusted to 10 mL. The tube was sealed under nitrogen atmosphere and irradiated with a 500 W high pressure mercury lamp using a 400 nm long wave pass glass filter.

Figure 16:
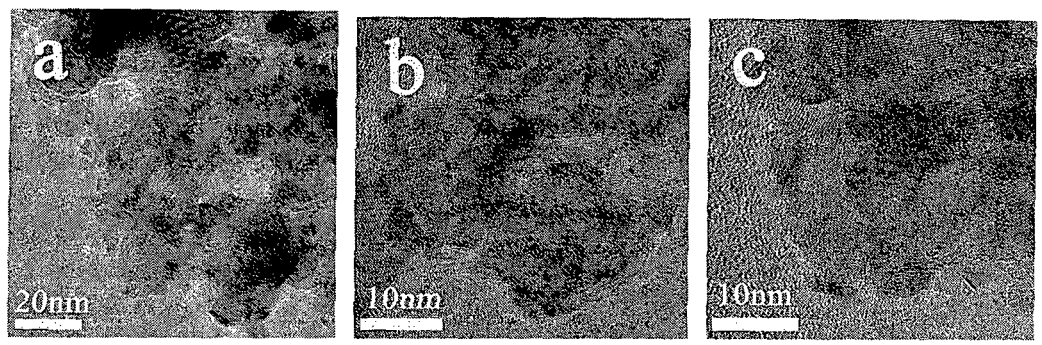
FIG. 16 shows the HRTEM image of $TiO_2$ adsorbed with CdTe quantum dots in Example 108.

Methanol is an important chemical material, and can be prepared not only from fossil resources using a chemical method, but also from biomass. Methanol has a simple structure with only one hydroxy functional group, and thus can be as a model compound of polyol biomass derivatives. Methanol is decomposed step by step. It is first oxidized into formaldehyde, while $H^+$ is reduced into $H_2$. The formaldehyde reacts with water to generate formic acid, which is finally oxidized into $CO_2$ and $H_2$. FIG. 16 shows the GC (gas chromatography) spectra of the gas phase collected after the photocatalytically reforming methanol system of Example 1. As can be seen from the figure, $H_2$ and $CO_2$ peaks appeared in sequence at different retention times. The hydrogen generation rate was 9.77 $\mu mol \cdot h^{-1}$. The morphology, structure and composition of the prepared catalysts were compared, analyzed and characterized with HRTEM, XRD and ICP before and after light irradiation.

In the present example, the semiconductor photocatalyst has a formula of $TiO_2$—$CdCo_xSe$, wherein x was determined to 0.13% through ICP (inductive coupled plasma emission spectrometer).

Example 95

A method for reforming a biomass derivative using a photocatalytic system comprising a composite semiconductor photocatalyst, comprising the following steps:

10 mg of P-25 $TiO_2$, 5 mL of CdSe quantum dots (the concentration of CdSe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 0.5 mL of $CoCl_2$ aqueous solution (original concentration: $4.2 \times 10^{-3}$ mol/L, containing 0.5 mg of $CoCl_2 \cdot 6H_2O$) and 4 mL of ethanol (original concentration 17.16 mol/L, 20° C.). Then the pH was adjusted to 11 with 1M NaOH, and the total volume was adjusted to 10 mL. The tube was sealed under nitrogen atmosphere and irradiated with a 500 W high pressure mercury lamp using a 400 nm long wave pass glass filter.

Figure 14:
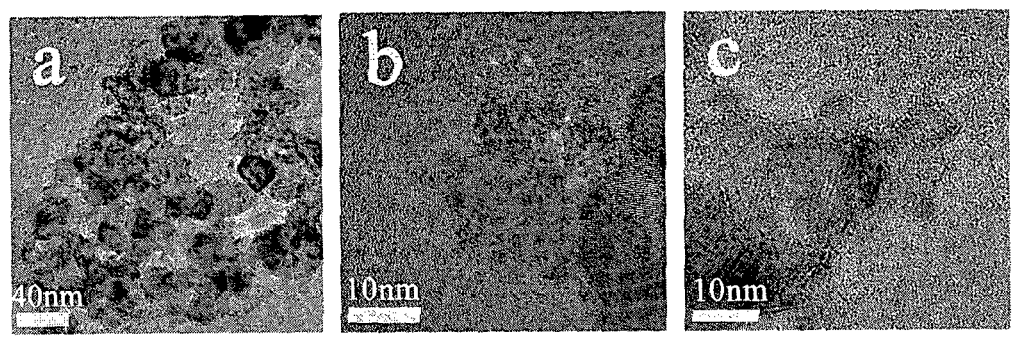
FIG. 14 shows the HRTEM image of $TiO_2$ adsorbed with CdSe quantum dots in Example 95.

FIG. 14 shows HRTEM images of CdSe quantum dots deposited on ultra-thin carbon film after absorbed with $TiO_2$ and ultrasonic dispersion in ethanol in the present example. As can be seen from the figure, the CdSe quantum dots were absorbed on the surface of $TiO_2$.

Figure 17:
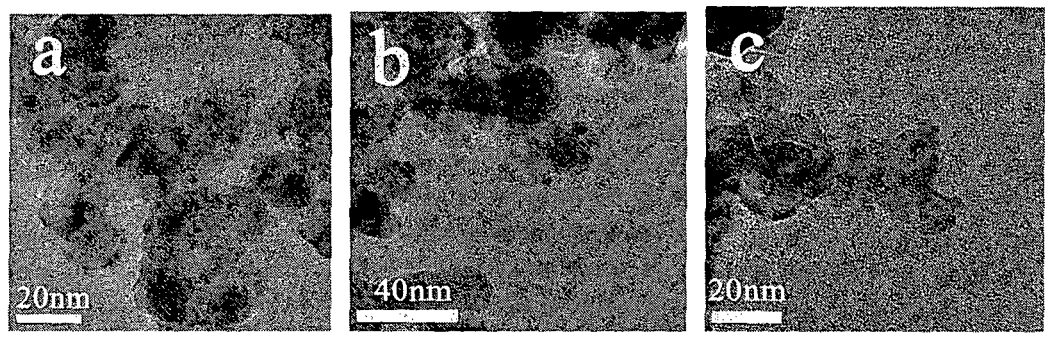
FIG. 17 shows the HRTEM image of the precipitates obtained after illumination of the system in Example 95.

FIG. 17 shows HRTEM images of the system deposited on ultra-thin carbon film after ultrasonic dispersion in ethanol in the present example. As can be seen from the figure, the CdSe quantum dots were absorbed on the surface of $TiO_2$ to form a composite structure.

Figure 18:
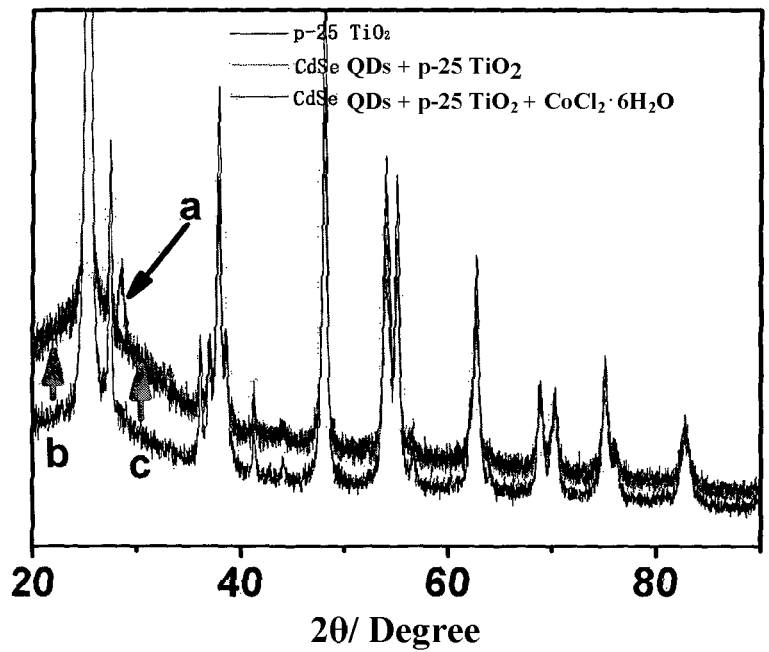
FIG. 18 shows the XRD pattern of $TiO_2$ only, $TiO_2$ adsorbed with CdSe quantum dots and $TiO_2$ adsorbed with CdSe quantum dots and then added with cobalt chloride in Example 95.

FIG. 18 shows the XRD patterns of three specimens, i.e., P-25 $TiO_2$ only, $TiO_2$ adsorbed with CdSe quantum dots and $TiO_2$ adsorbed with CdSe quantum dots and then added with cobalt chloride of the present Example. As can be seen from the figure, P25 $TiO_2$ shows the typical adsorption peaks of $TiO_2$; and after $TiO_2$ is adsorbed with CdSe quantum dots, the system simultaneously shows superpositions of the adsorptions of P-25 $TiO_2$ and CdSe quantum dots at b and c, confirming the adsorption of CdSe quantum dots on the surface of $TiO_2$; after further addition of cobalt chloride, another new adsorption peak appears at a on the basis of the superposition of the adsorptions of P-25 $TiO_2$ and CdSe quantum dots.

Figure 19:
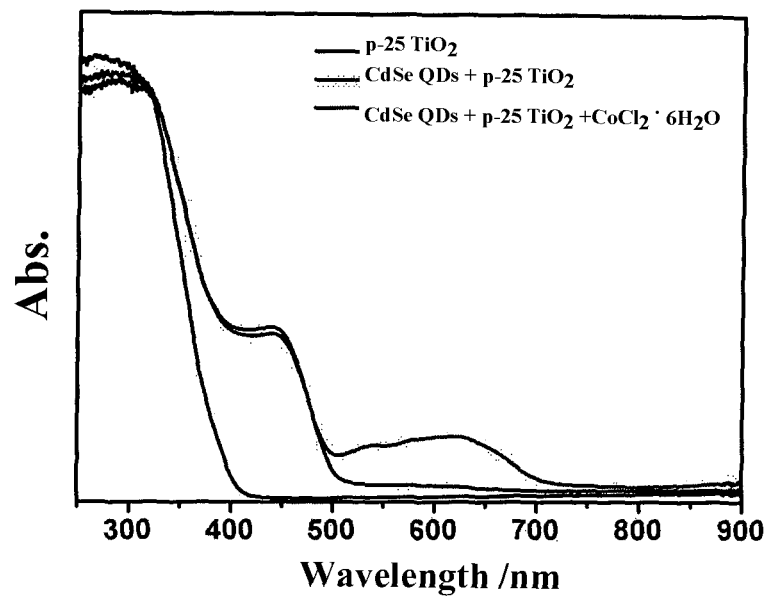
FIG. 19 shows the DRS (diffuse reflectance UV-Vis absorption spectroscopy) spectra of $TiO_2$ only, $TiO_2$ adsorbed with CdSe quantum dots and $TiO_2$ adsorbed with CdSe quantum dots and then added with cobalt chloride in Example 95.

FIG. 19 shows the DRS (diffuse reflectance UV-Vis absorption spectroscopy) spectra of three specimens, i.e., P-25 $TiO_2$ only, $TiO_2$ adsorbed with CdSe quantum dots and $TiO_2$ adsorpted with CdSe quantum dots and then added with cobalt chloride of the present Example. As can be seen from the figure, P25 $TiO_2$ shows the typical UV adsorption features of $TiO_2$; and after $TiO_2$ is adsorbed with CdSe quantum dots, the system simultaneously shows superpositions of the adsorptions of P-25 $TiO_2$ and CdSe quantum dots, confirming the adsorption of CdSe quantum dots on the surface of $TiO_2$; after further addition of cobalt chloride, another new broad adsorption band appears at a more redshaft position of 500-700 nm on the basis of the superposition of the adsorptions of P-25 $TiO_2$ and CdSe quantum dots.

Ethanol can be prepared in large scale from fermentation of biomass, and therefore, it is of practical interest to photocatalytically reforming ethanol to generate hydrogen. During the refounation of ethanol aqueous solution, ethanol was first oxidized to acetaldehyde during the initial stage of the photocatalytic reaction, and meanwhile $H^+$ was reduced to $H_2$. The acetaldehyde reacted with water to generate acetic acid, which was finally oxidized to $CO_2$ and $H_2$. Besides, acetaldehyde could react with hydroxyl radicals to yield $CO_2$ and $H_2$. FIG. 23 shows the GC (gas chromatography) spectra of the gas phase collected after the photocatalytically reforming methanol system of Example 95. As can be seen from the figure, $H_2$ and $CO_2$ peaks appeared in sequence at different retention times. The hydrogen generation rate was 47.8 $\mu mol \cdot h^{-1}$.

In the present example, the semiconductor photocatalyst has a formula of $TiO_2$—$CdCo_xSe$, wherein x was determined to 0.26% through ICP (inductive coupled plasma emission spectrometer).

Example 96

A method for reforming a biomass derivative using a photocatalytic system comprising a composite semiconductor photocatalyst, comprising the following steps:

10 mg of P-25 $TiO_2$, 5 mL of CdSe quantum dots (the concentration of CdSe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 0.5 mL of $CoCl_2$ aqueous solution (original concentration: $4.2 \times 10^{-3}$ mol/L, containing 0.5 mg of $CoCl_2.6H_2O$) and 4 ml of aqueous solution of sucrose (original concentration 0.25 mol/l, 20° C.). Then the pH was adjusted to 11 with 1 M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 21.7 $\mu mol \cdot h^{-1}$.

In the present example, the semiconductor photocatalyst has a formula of $TiO_2$—$CdCo_xSe$, wherein x was determined to 0.17% through ICP (inductive coupled plasma emission spectrometer).

Example 97

A method for reforming a biomass derivative using a photocatalytic system comprising a composite semiconductor photocatalyst, comprising the following steps:

10 mg of P-25 $TiO_2$, 5 mL of CdSe quantum dots (the concentration of CdSe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 0.5 mL of $CoCl_2$ aqueous solution (original concentration: $4.2 \times 10^{-3}$ mol/L, containing 0.5 mg of $CoCl_2.6H_2O$) and 4 mL of aqueous solution of glucose (original concentration 0.25 mol/L, 20° C.). Then the pH was adjusted to 7 with 1M NaOH or HCl, and the total volume was adjusted to 10 mL. The tube was sealed under nitrogen atmosphere and irradiated with a 500 W high pressure mercury lamp using a 400 nm long wave pass glass filter.

As the major component of biomass, it is of practical interest to study the photocatalytic reforming of glucose. During the initial stage of the photocatalytic reaction, glucose is first dehydrogenated to generate =C=O, —CH=O or —COOH groups, and then the carbon chains are successively oxidized to $CO_2$ by the holes on the surface of the catalysts, releasing $H^+$ that is reduced to $H_2$ at the same time. Since hydroxyl is the immediate, the reaction continues until all the carbons are oxidized to $CO_2$. FIG. 18 shows the GC (gas chromatography) spectra of the gas phase collected after the photocatalytic reforming of methanol system of Example 4. As can be seen from the figure, $H_2$ and $CO_2$ peaks appeared in sequence at different retention times. The hydrogen generation rate was 26.3 $\mu mol \cdot h^{-1}$.

In the present example, the semiconductor photocatalyst has a formula of $TiO_2$—$CdCo_xSe$, wherein x was determined to 0.16% through ICP (inductive coupled plasma emission spectrometer).

Example 98

A method for reforming a biomass derivative using a photocatalytic system comprising a composite semiconductor photocatalyst, comprising the following steps:

10 mg of P-25 $TiO_2$, 5 mL of CdSe quantum dots (the concentration of CdSe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 0.5 mL of $NiCl_2$ aqueous solution (original concentration: $4.2 \times 10^{-3}$ mol/L, containing 0.5 mg of $NiCl_2.6H_2O$) and 4 mL of ethanol (original concentration 17.16 mol/L, 20° C.). Then the pH was adjusted to 14 with 1 M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 25.4 $\mu mol \cdot h^{-1}$.

Example 99

A method for reforming a biomass derivative using a photocatalytic system comprising a composite semiconductor photocatalyst, comprising the following steps:

10 mg of P-25 $TiO_2$, 5 mL of CdSe quantum dots (the concentration of CdSe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 0.5 mL of $NiSO_4$ aqueous solution (original concentration: $4.2 \times 10^{-3}$ mol/L, containing 0.55 mg of $NiSO_4.6H_2O$) and 4 mL of ethanol (original concentration 17.16 mol/L, 20° C.). Then the pH was adjusted to 11 with 1 M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 28.7 $\mu mol \cdot h^{-1}$.

Example 100

A method for reforming a biomass derivative using a photocatalytic system comprising a composite semiconductor photocatalyst, comprising the following steps:

10 mg of P-25 $TiO_2$, 5 mL of CdSe quantum dots (the concentration of CdSe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 1 mg of $Fe_3(CO)_{12}$ and 4 mL of methanol (original concentration 24.75 mol/L, 20° C.). Then the pH was adjusted to 11 with 1 M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 1.8 $\mu mol \cdot h^{-1}$.

Example 101

A method for reforming a biomass derivative using a photocatalytic system comprising a composite semiconductor photocatalyst, comprising the following steps:

10 mg of P-25 $TiO_2$, 5 mL of CdSe quantum dots (the concentration of CdSe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 1 mg of $Fe_3(CO)_{12}$ and 4 mL of ethanol (original concentration 17.16 mol/L, 20° C.). Then the pH was adjusted to 11 with 1 M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 1.5 $\mu mol \cdot h^{-1}$.

Example 102

A method for reforming a biomass derivative using a photocatalytic system comprising a composite semiconductor photocatalyst, comprising the following steps:

10 mg of P-25 $TiO_2$, 5 mL of CdSe quantum dots (the concentration of CdSe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 0.42 mg of $Fe(CO)_5$ and 4 mL of ethanol (original concentration 17.16 mol/L, 20° C.). Then the pH was adjusted to 11 with 1M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 0.5 $\mu mol \cdot h^{-1}$.

Example 103

A method for reforming a biomass derivative using a photocatalytic system comprising a composite semiconductor photocatalyst, comprising the following steps:

10 mg of P-25 $TiO_2$, 1 mL of CdS quantum dots (the concentration of CdS stock solution is based on the concentration of cadmium ion, which is equal to $5 \times 10^{-3}$ mol/L) and 4 mL of $H_2O$ were added into a Pyrex tube, and the pH of the mixture was adjusted to 11 with a 1 mol/L NaOH. The mixture was centrifuged, discarded the supernatant to keep the precipitates, followed by addition of 0.5 mL of $CoCl_2$ aqueous solution (original concentration: $4.2 \times 10^{-3}$ mol/L, containing 0.5 mg of $CoCl_2 \cdot 6H_2O$) and 4 mL of methanol (original concentration 24.75 mol/L, 20° C.). Then the pH was adjusted to 11 with 1M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 37.4 $\mu mol \cdot h^{-1}$. In the present example, the semiconductor photocatalyst has a formula of $TiO_2$—$CdCo_xS$, wherein x is 0.02%.

Example 104

A method for reforming a biomass derivative using a photocatalytic system comprising a composite semiconductor photocatalyst, comprising the following steps:

10 mg of P-25 $TiO_2$, 1 mL of CdS quantum dots (the concentration of CdS stock solution is based on the concentration of cadmium ion, which is equal to $5 \times 10^{-3}$ mol/L) and 4 mL of $H_2O$ were added into a Pyrex tube, and the pH of the mixture was adjusted to 11 with a 1 mol/L NaOH. The mixture was centrifuged, discarded the supernatant to keep the precipitates, followed by addition of 0.5 mL of $CoCl_2$ aqueous solution (original concentration: $4.2 \times 10^{-3}$ mol/L, containing 0.5 mg of $CoCl_2 \cdot 6H_2O$) and 4 mL of ethanol (original concentration 17.16 mol/L, 20° C.). Then the pH was adjusted to 11 with 1M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 63.6 $\mu mol \cdot h^{-1}$.

Example 105

A method for reforming a biomass derivative using a photocatalytic system comprising a composite semiconductor photocatalyst, comprising the following steps:

10 mg of P-25 $TiO_2$, 1 mL of CdS quantum dots (the concentration of CdS stock solution is based on the concentration of cadmium ion, which is equal to $5 \times 10^{-3}$ mol/L) and 4 mL of $H_2O$ were added into a Pyrex tube, and the pH of the mixture was adjusted to 11 with a 1 mol/L NaOH. The mixture was centrifuged, discarded the supernatant to keep the precipitates, followed by addition of 0.5 mL of $NiCl_2$ aqueous solution (original concentration: $4.2 \times 10^{-3}$ mol/L, containing 0.5 mg of $NiCl_2 \cdot 6H_2O$) and 4 mL of ethanol (original concentration 17.16 mol/L, 20° C.). Then the pH was adjusted to 11 with 1 M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 129 $\mu mol \cdot h^{-1}$.

In the present example, the semiconductor photocatalyst has a formula of $TiO_2$—$CdNi_xS$, wherein x was determined to 0.14% through ICP (inductive coupled plasma, emission spectrometer).

Figure 15:
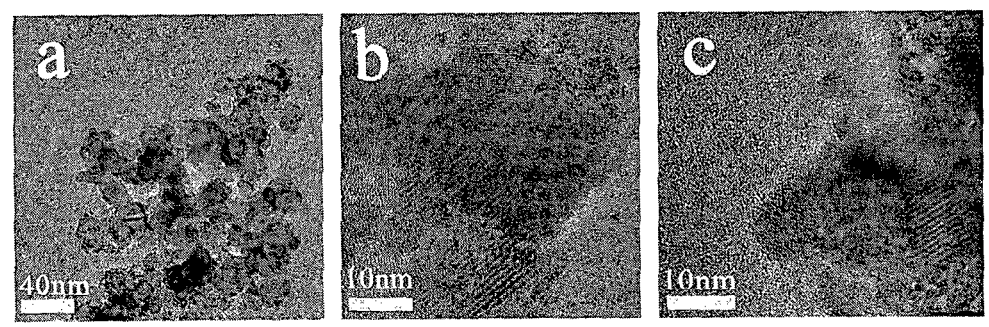
FIG. 15 shows the HRTEM image of $TiO_2$ adsorbed with CdS quantum dots in Example 105.

FIG. 15 shows HRTEM images of CdS quantum dots deposited on ultra-thin carbon film after absorbed with $TiO_2$ and ultrasonic dispersion in ethanol in the present example. As can be seen from the figure, the CdS quantum dots were absorbed on the surface of $TiO_2$.

Figure 20:
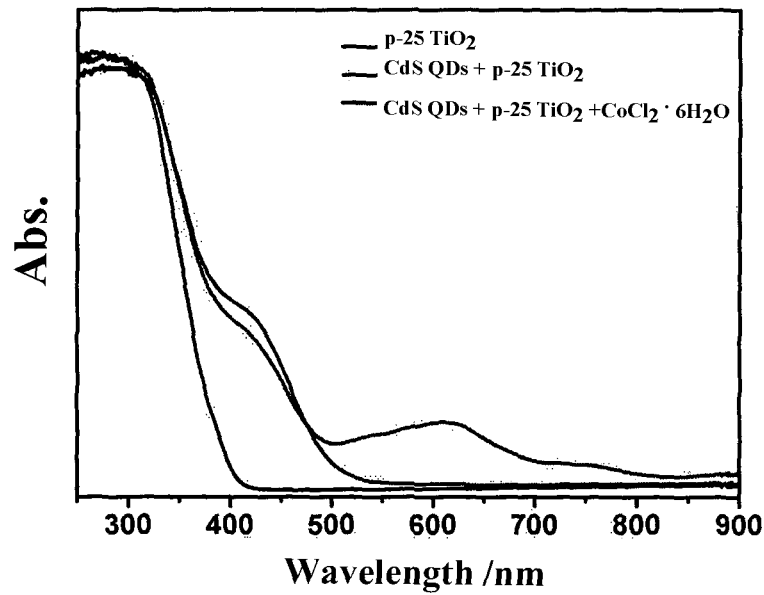
FIG. 20 shows the DRS spectra of $TiO_2$ only, $TiO_2$ adsorbed with CdS quantum dots and $TiO_2$ adsorbed with CdS quantum dots and then added with cobalt chloride in Example 105.

FIG. 20 shows the DRS (diffuse reflectance UV-Vis absorption spectroscopy) spectra of three specimens, i.e., P-25 $TiO_2$ only, $TiO_2$ adsorbed with CdS quantum dots and TiO₂ adsorbed with CdS quantum dots and then added with cobalt chloride of the present Example. As can be seen from the figure, P25 TiO₂ shows the typical UV adsorption features of TiO₂; and after TiO₂ is adsorbed with CdS quantum dots, the system simultaneously shows superpositions of the adsorptions of P-25 TiO₂ and CdS quantum dots, confirming the adsorption of CdS quantum dots on the surface of TiO₂; after further addition of cobalt chloride, another new broad adsorption band appears at a more redshaft position of 500-800 nm on the basis of the superposition of the adsorptions of P-25 TiO₂ and CdS quantum dots.

Example 106

A method for reforming a biomass derivative using a photocatalytic system comprising a composite semiconductor photocatalyst, comprising the following steps:

10 mg of P-25 $TiO_2$, 1 mL of CdS quantum dots (the concentration of CdS stock solution is based on the concentration of cadmium ion, which is equal to $5 \times 10^{-3}$ mol/L) and 4 mL of $H_2O$ were added into a Pyrex tube, and the pH of the mixture was adjusted to 11 with a 1 mol/L NaOH. The mixture was centrifuged, discarded the supernatant to keep the precipitates, followed by addition of 0.5 mL of $NiSO_4$ aqueous solution (original concentration: $4.2 \times 10^{-3}$ mol/L, containing 0.55 mg of $NiSO_4.6H_2O$) and 4 mL of ethanol (original concentration 17.16 mol/L, 20° C.). Then the pH was adjusted to 11 with 1M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 59.3 $\mu mol \cdot h^{-1}$. In the present example, the semiconductor photocatalyst has a formula of $TiO_2$—$CdNi_xS$, wherein x is 1.0%.

Example 107

A method for reforming a biomass derivative using a photocatalytic system comprising a composite semiconductor photocatalyst, comprising the following steps:

10 mg of P-25 $TiO_2$, 5 mL of CdTe quantum dots (the concentration of CdTe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 0.5 mL of $CoCl_2$ aqueous solution (original concentration: $4.2 \times 10^{-3}$ mol/L, containing 0.5 mg of $CoCl_2.6H_2O$) and 4 mL of methanol (original concentration 24.75 mol/L, 20° C.). Then the pH was adjusted to 11 with 1M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 3.58 $\mu mol \cdot h^{-1}$.

In the present example, the semiconductor photocatalyst has a formula of $TiO_2$—$CdCo_xTe$, wherein x was determined to 0.30% through ICP (inductive coupled plasma emission spectrometer).

Example 108

A method for reforming a biomass derivative using a photocatalytic system comprising a composite semiconductor photocatalyst, comprising the following steps:

10 mg of P-25 $TiO_2$, 5 mL of CdTe quantum dots (the concentration of CdTe stock solution is based on the concentration of cadmium ion, which is equal to $1 \times 10^{-3}$ mol/L) were added into a Pyrex tube, and the pH of the mixture was adjusted to 11 with a 1 mol/L NaOH. The mixture was centrifuged, discarded the supernatant to keep the precipitates, followed by addition of 0.5 mL of $CoCl_2$ aqueous solution (original concentration: $4.2 \times 10^{-3}$ mol/L, containing 0.5 mg of $CoCl_2.6H_2O$) and 4 mL of ethanol (original concentration 17.16 mol/L, 20° C.). Then the pH was adjusted to 11 with 1M NaOH, and the total volume was adjusted to 10 mL. The tube was sealed under nitrogen atmosphere and irradiated with a 500 W high pressure mercury lamp using a 400 nm long wave pass glass filter.

During the reaction, the generated hydrogen was detected with GC equipped with TCD (thermal conductivity detector), and the hydrogen generation rate was 2.5 $\mu mol \cdot h^{-1}$.

FIG. 16 shows HRTEM images of CdTe quantum dots deposited on ultra-thin carbon film after absorbed with TiO₂ and ultrasonic dispersion in ethanol in the present example. As can be seen from the figure, the CdTe quantum dots were absorbed on the surface of TiO₂.

Figure 21:
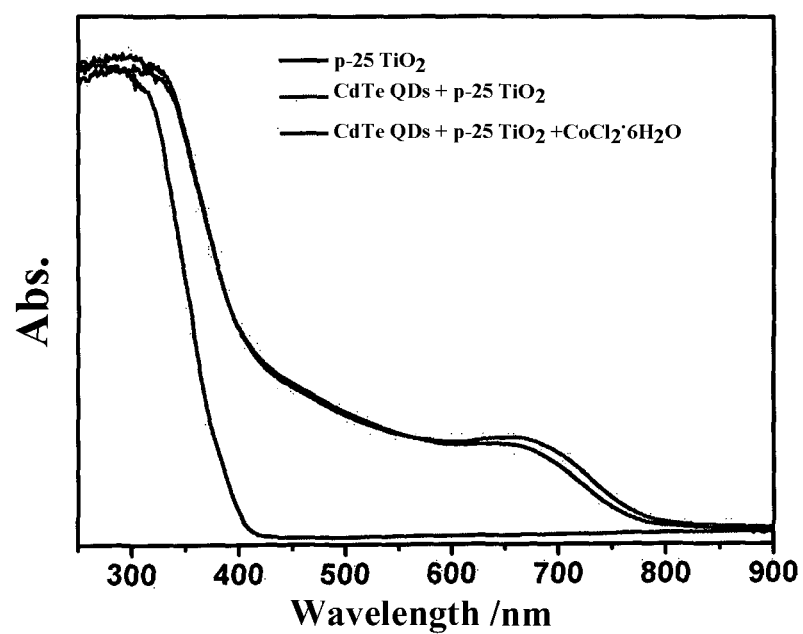
FIG. 21 shows the DRS spectra of $TiO_2$ only, $TiO_2$ adsorbed with CdTe quantum dots and $TiO_2$ adsorbed with CdTe quantum dots and then added with cobalt chloride in Example 108.

FIG. 21 shows the DRS (diffuse reflectance UV-Vis absorption spectroscopy) spectra of three specimens, i.e., P-25 TiO₂ only, TiO₂ adsorbed with CdTe quantum dots and TiO₂ adsorpted with CdTe quantum dots and then added with cobalt chloride of the present Example. As can be seen from the figure, P25 TiO₂ shows the typical UV adsorption peaks of TiO₂; and after TiO₂ is adsorbed with CdTe quantum dots, the system simultaneously shows superpositions of the adsorptions of P-25 TiO₂ and CdTe quantum dots, confirming the adsorption of CdTe quantum dots on the surface of TiO₂; after further addition of cobalt chloride, no new adsorption band appears on the basis of the superposition of the adsorptions of P-25 TiO₂ and CdTe quantum dots.

It is apparently that the above examples of the present invention are only for illustration of the present invention without any limitation to the embodiments of the present invention. Various modifications or variations can be made for a skilled person in the art based on the above description. It is impossible to list all the embodiments here. Any obvious modification or variation derived from the embodiments of the present invention is still within the scope of the present invention.

What is claimed is:

1. A method for preparing a semiconductor photocatalyst for photocatalytically reforming biomass derivatives to generate hydrogen, wherein the semiconductor photocatalyst has a formula of Y-M~N-A$_x$:
   wherein, Y is one selected from the group consisting of TiO₂, SnO₂ and ZnO, or is absent;
   wherein, M~N is Group II element~VI element, or M~N is Group III~V element;
   wherein, A is one or two or more elements selected from the group consisting of Co, Ni, Fe, Cu, Cr, Pd, Pt, Ru, Rh, Ir, Au and Ag; and 0.02%≤x≤1.0%;
   wherein, the Group II element is selected from Zn or Cd; the Group VI element is selected from S, Se, or Te; the Group III element is In, and the Group V element is selected from P or As;
   wherein, in case that the semiconductor photocatalyst has the formula of M~N-A$_x$, the preparing method comprising:
   1) introducing quantum dots consisting of Group II~VI elements or Group III~V elements into a reactor;
   2) introducing into the precipitates one or two or more selected from the group consisting of a cobalt salt, a cobalt complex, a nickel salt, a nickel complex, an iron salt, an iron complex, a copper salt and a chromium salt, or a solution of a salt of Pd, Pt, Ru, Rh, Ir, Au or Ag, to obtain a mixed solution A;
3) introducing an aqueous solution of a biomass derivative into the mixed solution A to obtain a mixed solution B;
4) adjusting the pH value of the mixed solution B to 3~10 to provide a mixed solution C, wherein the pH is adjusted by dropwise addition of 1 mol/L NaOH or 1 mol/L HCl;
5) degassing the solution C of step 4) with an inert gas or vacuumizing the reactor; and irradiating the reactor with UV light, visible light or a mixed beam of UV and visible light to prepare in situ the semiconductor photcatalyst of formula M~N-$A_x$ under inert gas or vacuum atmosphere; or wherein, in case that the semiconductor photocatalyst has a formula of Y-M~N-$A_x$, the preparing method comprising:
1) introducing quantum dots consisting of Group II~VI elements or Group III~V elements into a reactor, then adding $TiO_2$, $SnO_2$ or ZnO, adjusting pH≥7, centrifuging and discarding the supernatant to keep the precipitates;
2) introducing into the precipitates one or two or more selected from the group consisting of a cobalt salt, a cobalt complex, a nickel salt, a nickel complex, an iron salt, an iron complex, a copper salt and a chromium salt, or a solution of a salt of Pd, Pt, Ru, Rh, Ir, Au or Ag;
3) introducing an aqueous solution of a biomass derivative into the precipitates;
4) irradiating the reactor with UV light and/or visible light to prepare the semiconductor photocatalyst of the formula of $TiO_2$-M~N-$A_x$, $SnO_2$-M~N-$A_x$, or ZnO-M~N-$A_x$ under inert gas or vacuum atmosphere.

2. The method for preparing the semiconductor photocatalyst of claim 1, wherein, the semiconductor photocatalyst has the formula of M~N-$A_x$, the biomass derivatives may be methanol, ethanol, propanol, butanol, ethylene glycol, glycerol, glucose, sucrose, fructose, maltose, mannose, ascorbic acid, L-proline or L-cysteine.

3. The method for preparing the semiconductor photocatalyst of claim 1, wherein the semiconductor photocatalyst has the formula of Y-M~N-$A_x$, the biomass derivatives comprise triethanolamine, triethylamine, methanol, ethanol, propanol, butanol, ethylene glycol, glycerol, glucose, sucrose, fructose, maltose or mannose.

4. The method for preparing the semiconductor photocatalyst of claim 1, wherein the quantum dots composed of Group II~VI elements include composite quantum dots composed of one or two or more selected from the group consisting of CdS, CdSe, CdTe, PbS, PbSe, ZnS and ZnSe; and the quantum dots composed of Group III~V elements include composite quantum dots composed of one or two selected from the group consisting of InP and InAs.

5. The method for preparing the semiconductor photocatalyst of claim 1, wherein the semiconductor photocatalyst has the formula of M~N-$A_x$, the quantum dots composed of Group II~VI elements or Group III~V elements in step 1) have a concentration larger than $1 \times 10^{-4}$ g/L; or
wherein the semiconductor photocatalyst has the formula of Y-M~N-$A_x$, the quantum dots composed of Group II~VI elements or Group III~V elements in step 1) have a concentration larger than $1 \times 10^{-4}$ g/L.

6. The method for preparing the semiconductor photocatalyst of claim 1, wherein the semiconductor photocatalyst has the formula of M~N-$A_x$, the solution of the salts or complexes of Co, Ni, Fe, Cu, Cr, Pd, Pt, Ru, Rh, Ir, Au or Ag of step 2) has a concentration larger than $1 \times 10^{-6}$ mol/L in the whole reaction system;

wherein the semiconductor photocatalyst has the formula of Y-M~N-Ax, the solution of the salts or complexes of Co, Ni, Fe, Cu, Cr, Pd, Pt, Ru, Rh, Ir, Au or Ag of step 2) has a concentration larger than $1 \times 10^{-6}$ mol/L in the whole reaction system;

the cobalt salt is cobalt halide, cobalt sulphate, cobalt nitrate, cobalt carbonate, cobalt oxalate, cobalt acetate, cobalt phosphate or cobalt chromate;

the cobalt complex is cobalt-ammonia complex ($[Co(NH_3)_6]^{3+}$), cobalt-cyanogen complex ($[Co(CN)_6]^{4-}$), cobalt-thiocyanate complex ($[Co(SCN)_4]^{2-}$), cobalt-carbonyl complex ($[Co(CO)_4]^-$), cobalt-nitrate complex($[Co(NO_3)_4]^{2-}$), cobalt-nitrite complex($[Co(NO_2)_6]^{3-}$) or cobalt-diacetyldioxime complex; wherein the cobalt-diacetyldioxime complex and derivatives thereof having the following formulae:

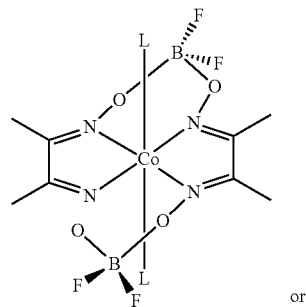

or

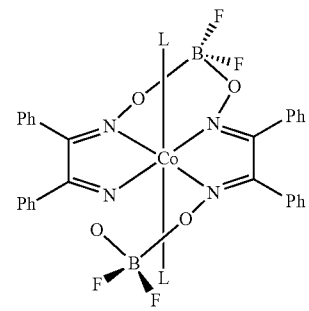

or

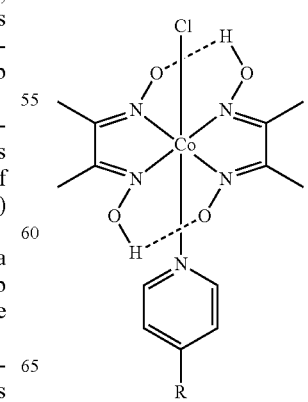

or

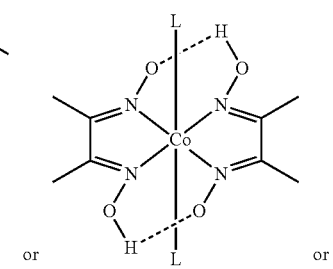

or

-continued

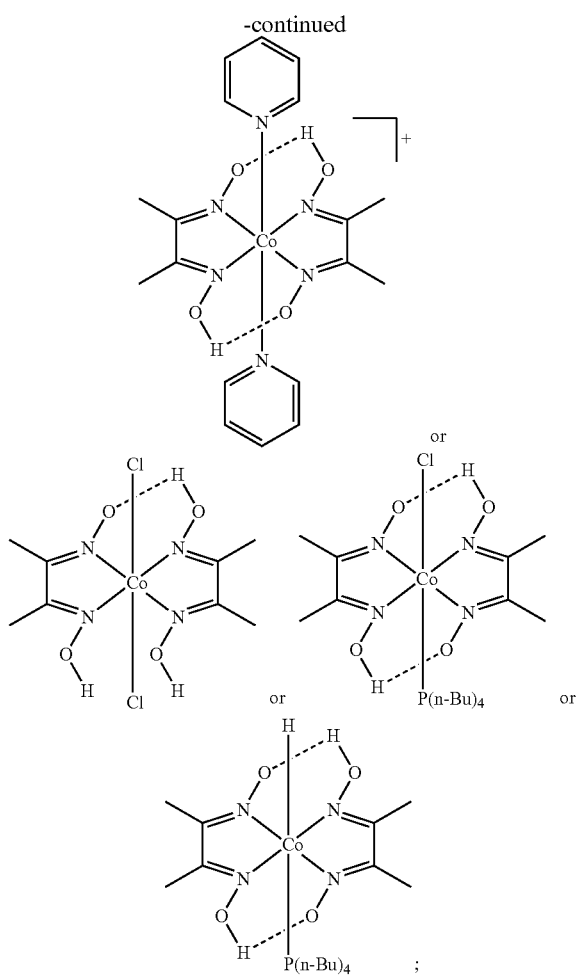

wherein, L is H$_2$O or CH$_3$CN; R is H, N(CH$_3$)$_2$ or (COOCH$_3$);

the nickel salt is nickel halide, nickel sulphate, nickel nitrate, nickel carbonate, nickel oxalate, nickel acetate, nickel phosphate or nickel chromite;

the nickel complex is nickel-ammonia complex ([Ni(NH$_3$)$_6$]$^{2+}$), nickel-cyanogen complex ([Ni(CN)$_4$]$^{2-}$), nickel-chelate([Ni(en)$_3$]$^{2+}$), nickel-carbonyl complex(Ni(CO)$_4$), nickel-ethyl complex (C$_2$H$_5$)$_2$Ni);

the iron salt is iron halide, iron sulphate, iron nitrate, iron carbonate, iron oxalate, iron acetate, iron phosphate, iron chromate, ferrous halide, ferrous sulphate, ferrous nitrate, ferrous carbonate, ferrous oxalate, ferrous acetate, ferrous phosphate, ferrous chromate or ferrous ammonium sulphate;

the iron complex is iron-cyanogen complex[Fe(CN)$_6$]$^{3-}$, ferrous-cyanogen complex[Fe(CN)$_6$]$^{4-}$, iron-thiocyanate complex[Fe(SCN)$_3$], iron-sulfur complex[Fe$_2$S$_2$(C0)$_6$], iron-carbonyl complex Fe(CO)$_5$, iron-carbonyl complex Fe$_2$(CO)$_9$, or iron-carbonyl complex Fe$_3$(CO)$_{12}$;

the copper salt comprises copper halide, copper sulphate (pentahydrate, monohydrate or anhydrous), copper nitrate, copper carbonate, copper oxalate, copper acetate, copper phosphate, copper chromate, copper pyrophosphate, copper cyanide, copper stearate, copper naphthenate, cuprous halide, cuprous sulphate, cuprous carbonate, or cuprous acetate;

the chromium salt comprises chromium halide, chromium sulphate, chromium nitrate, chromium carbonate, chromium oxalate, chromium acetate, or chromium phosphate;

the palladium salt comprises potassium palladochloride, palladium halide, palladium sulphate, palladium nitrate, or palladium acetate;

the platinum salt comprises potassium platinochloride, platinum halide, or platinum nitrate;

the ruthenium salt comprises ruthenium halide, ruthenium sulphate, ruthenium nitrate, or ruthenium acetate;

the rhodium salt comprises rhodium halide, rhodium sulphate, rhodium nitrate, or rhodium acetate;

the gold salt comprises gold halide or chloroauric acid;

the silver salt comprises silver halide, silver sulphate, silver nitrate, or silver acetate.

7. The method for preparing the semiconductor photocatalyst of claim 1, wherein the semiconductor photocatalyst has the formula of M~N-A$_x$, the biomass derivative in step 3) has a concentration equal to larger than $1\times10^{-4}$ mol/L or a molar percentage equal to larger than 0.01% in the whole reaction system;

wherein the semiconductor photocatalyst has the formula of Y-M~N-A$_x$, the biomass derivative in step 3) has a concentration equal to larger than $1\times10^{-4}$ mol/L or a molar percentage equal to larger than 0.01% in the whole reaction system.

8. A method for photocatalytically reforming biomass derivatives to generate hydrogen using a semiconductor photocatalyst, wherein the semiconductor photocatalyst has a formula of M~N-A$_x$, wherein, M~N is Group II~VI elements, or M~N is a Group III~V elements;

wherein, A is one or two or more elements selected from the group consisting of Co, Ni, Fe, Cu, Cr, Pd, Pt, Ru, Rh, Ir, Au and Ag; and $0.02\% \leq x \leq 1.0\%$;

the method for preparing hydrogen comprising:

1) introducing quantum dots consisting of Group II~VI elements or Group III~V elements into a reactor;

2) introducing into the reactor one or more selected from the group consisting of a cobalt salt, a cobalt complex, a nickel salt, a nickel complex, an iron salt, an iron complex, a copper salt and a chromium salt, or a solution of a salt of Pd, Pt, Ru, Rh, Ir, Au or Ag, to obtain a mixed solution A;

3) introducing an aqueous solution of a biomass derivative into the mixed solution A to obtain a mixed solution B;

4) adjusting pH of the mixed solution B to 3~10 to obtain a mixed solution C;

5) degassing the mixed solution C of step 4) with an inert gas or vacuumizing the reactor; and irradiating the reactor with UV light, visible light or a mixed beam of UV and visible light under inert gas or vacuum atmosphere to prepare in situ the semiconductor photocatalyst and to generate hydrogen; or wherein the semiconductor photocatalyst has a formula of Y-M~N-A$_x$, wherein Y is selected from the group consisting of TiO$_2$, SnO$_2$ and ZnO;

wherein, M~N is a Group II~VI element, or M~N is a Group III~V element;

wherein, A is one or more elements selected from the group consisting of Co, Ni, Fe, Cu, Cr, Pd, Pt, Ru, Rh, Ir, Au and Ag; and $0.02\% \leq x \leq 1.0\%$;

the method for preparing hydrogen comprising:

1) introducing quantum dots composed of Group II~VI elements or Group III~V elements into a reactor, then adding $TiO_2$, $SnO_2$ or ZnO, adjusting pH 7, centrifuging and discarding the supernatant to keep the precipitates;

2) introducing into the precipitates one or two or more selected from the group consisting of a cobalt salt, a cobalt complex, a nickel salt, a nickel complex, an iron salt, an iron complex, a copper salt and a chromium salt, or a solution of a salt of Pd, Pt, Ru, Rh, Ir or Ag;

3) introducing an aqueous solution of a biomass derivative into the precipitates, and adjusting pH≥7;

4) irradiating the reactor with UV and/or visible light under inert gas or vacuum atmosphere to prepare in situ the composite semiconductor catalyst and to generate hydrogen.

9. The method for photocatalytically reforming biomass derivatives to generate hydrogen of claim 8, wherein the quantum dots composed of a Group II~VI elements, or a Group III~V elements have a concentration greater than $1 \times 10^{-4}$ g/L;

the quantum dots composed of Group II~VI elements include composite quantum dots composed of one or more selected from the group consisting of CdS, CdSe, CdTe, PbS, PbSe, ZnS and ZnSe;

the quantum dots composed of Group III~V elements include composite quantum dots composed of one or two selected from the group consisting of InP and InAs.

10. The method for photocatalytically reforming biomass derivatives to generate hydrogen of claim 8, wherein the semiconductor photocatalyst has the formula of M~N-$A_x$, the solution of the salts or complexes of Co, Ni, Fe, Cu, Cr, Pd, Pt, Ru, Rh, Ir, Au or Ag of step 2) has a concentration equal to or larger than $1 \times 10^{-6}$ mol/L in the whole reaction system;

wherein the semiconductor photocatalyst has the formula of Y-M~N-Ax, the solution of the salts or complexes of Co, Ni, Fe, Cu, Cr, Pd, Pt, Ru, Rh, Ir, Au or Ag of step 2) has a concentration equal to or larger than $1 \times 10^{-6}$ mol/L in the whole reaction system;

the cobalt salt is cobalt halide, cobalt sulphate, cobalt nitrate, cobalt carbonate, cobalt oxalate, cobalt acetate, cobalt phosphate or cobalt chromate;

the cobalt complex is cobalt-ammonia complex ($[Co(NH_3)_6]^{3+}$), cobalt-cyanogen complex ($[Co(CN)_6]^{4-}$), cobalt-thiocyanate complex ($[Co(SCN)_4]2-$), cobalt-carbonyl complex ($[Co(CO)_4]^-$), cobalt-nitrate complex($[Co(NO_3)_4]^{2-}$), cobalt-nitrite complex($[Co(NO_2)_6]^{3-}$) or cobalt-diacetyldioxime complex; wherein the cobalt-diacetyldioxime complex and derivatives thereof having the following formulae:

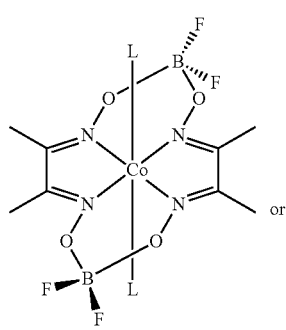 or

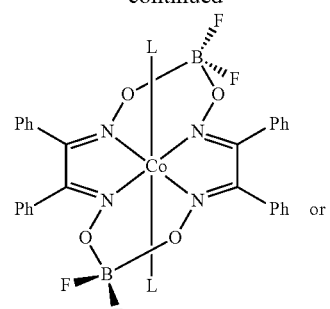 or

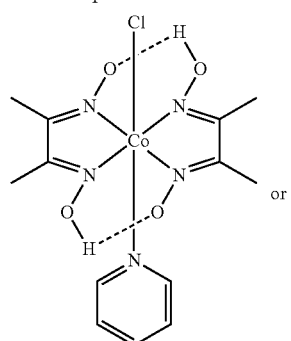 or

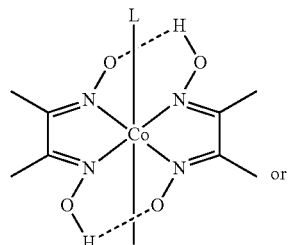 or

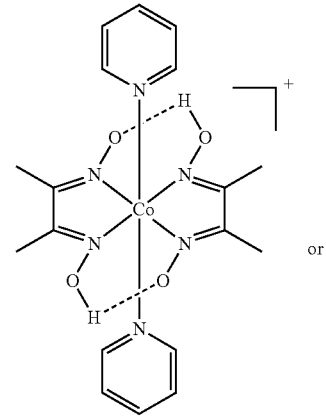 or

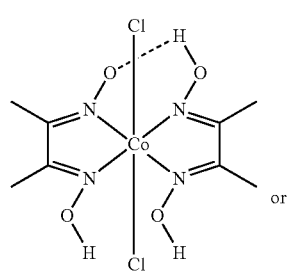 or

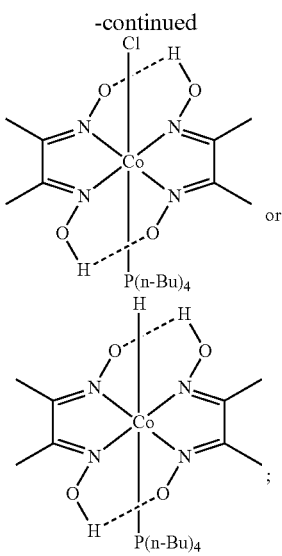

wherein, L is H$_2$O or CH$_3$CN; R is H, N(CH$_3$)$_2$ or (COOCH$_3$);

the nickel salt is nickel halide, nickel sulphate, nickel nitrate, nickel carbonate, nickel oxalate, nickel acetate, nickel phosphate or nickel chromite;

the nickel complex is nickel-ammonia complex ([Ni(NH$_3$)$_6$]$^{2+}$), nickel-cyanogen complex ([Ni(CN)$_4$]$^{2-}$), nickel-chelate([Ni(en)$_3$]$^{2+}$), nickel-carbonyl complex(Ni(CO)$_4$), nickel-ethyl complex (C$_2$H$_5$)$_2$Ni);

the iron salt is iron halide, iron sulphate, iron nitrate, iron carbonate, iron oxalate, iron acetate, iron phosphate, iron chromate, ferrous halide, ferrous sulphate, ferrous nitrate, ferrous carbonate, ferrous oxalate, ferrous acetate, ferrous phosphate, ferrous chromate or ferrous ammonium sulphate;

the iron complex is iron-cyanogen complex[Fe(CN)$_6$]$^{3-}$, ferrous-cyanogen complex[Fe(CN)$_6$]$^{4-}$, iron-thiocyanate complex[Fe(SCN)$_3$], iron-sulfur complex[Fe$_2$S$_2$(CO)$_6$], iron-carbonyl complex Fe(CO)$_5$, iron-carbonyl complex Fe$_2$(CO)$_9$, or iron-carbonyl complex Fe$_3$(CO)$_{12}$;

the copper salt comprises copper halide, copper sulphate (pentahydrate, monohydrate or anhydrous), copper nitrate, copper carbonate, copper oxalate, copper acetate, copper phosphate, copper chromate, copper pyrophosphate, copper cyanide, copper stearate, copper naphthenate, cuprous halide, cuprous sulphate, cuprous carbonate, or cuprous acetate;

the chromium salt comprises chromium halide, chromium sulphate, chromium nitrate, chromium carbonate, chromium oxalate, chromium acetate, or chromium phosphate;

the palladium salt comprises potassium palladochloride, palladium halide, palladium sulphate, palladium nitrate, or palladium acetate;

the platinum salt comprises potassium platinochloride, platinum halide, or platinum nitrate;

the ruthenium salt comprises ruthenium halide, ruthenium sulphate, ruthenium nitrate, or ruthenium acetate;

the rhodium salt comprises rhodium halide, rhodium sulphate, rhodium nitrate, or rhodium acetate;

the gold salt comprises gold halide or chloroauric acid;

the silver salt comprises silver halide, silver sulphate, silver nitrate, or silver acetate.

11. The method for photocatalytically reforming biomass derivatives to generate hydrogen of claim 8, wherein the semiconductor photocatalyst has the formula of M~N-A$_x$, biomass derivative in step 3) has a concentration equal to or larger than 1×10$^{-4}$ mol/L or a molar percentage of equal to or larger than 0.01% in the whole reaction system; or wherein the semiconductor photocatalyst has the formula of Y-M~N-Ax, the biomass derivative in step 3) has a concentration equal to or larger than 1×10$^{-4}$ mol/L or a molar percentage of equal to or larger than 0.01% in the whole reaction system.

12. The method for photocatalytically reforming biomass derivatives to generate hydrogen of claim 8, wherein the quantum dots composed of a Group II~VI elements, or a Group III~V elements have a concentration larger than 1×10$^{-4}$ g/L, wherein the quantum dots composed of Group II~VI elements include composite quantum dots composed of one or two or more selected from the group consisting of CdS, CdSe, CdTe, PbS, PbSe, ZnS and ZnSe; and the quantum dots composed of Group III~V elements include composite quantum dots composed of one or two selected from the group consisting of InP and InAs.

13. The method for photocatalytically reforming biomass derivatives to generate hydrogen of claim 8, wherein, the semiconductor photocatalyst has the formula of M~N-A$_x$, the biomass derivatives may be methanol, ethanol, propanol, butanol, ethylene glycol, glycerol, glucose, sucrose, fructose, maltose, mannose, ascorbic acid, L-proline or L-cysteine; or wherein, the semiconductor photocatalyst has the formula of Y-M~N-A$_x$, the biomass derivatives comprise triethanolamine, triethylamine, methanol, ethanol, propanol, butanol, ethylene glycol, glycerol, glucose, sucrose, fructose, maltose or mannose.

\* \* \* \* \*

UNITED STATES PATENT AND TRADEMARK OFFICE
CERTIFICATE OF CORRECTION

PATENT NO. : 9,073,037 B2  Page 1 of 1
APPLICATION NO. : 13/883180
DATED : July 7, 2015
INVENTOR(S) : Wu et al.

It is certified that error appears in the above-identified patent and that said Letters Patent is hereby corrected as shown below:

In the claims

Column 41, line 1, claim 8 after pH insert --≥--

Signed and Sealed this
First Day of December, 2015

Michelle K. Lee
*Director of the United States Patent and Trademark Office*